US012729564B2

(12) United States Patent
Maiga et al.

(10) Patent No.: US 12,729,564 B2
(45) Date of Patent: Sep. 8, 2026

(54) ELECTRONIC DOOR LOCK WITH DIRECT DRIVE

(71) Applicant: PassiveBolt, Inc., Ann Arbor, MI (US)

(72) Inventors: Kabir Zachary Maiga, Superior Township, MI (US); Philip Michael Johnson, Plymouth, MI (US); Simon Forster, Cologne (DE)

(73) Assignee: Passive Bolt, Inc., Ann Arbor, MI (US)

( * ) Notice: Subject to any disclaimer, the term of this patent is extended or adjusted under 35 U.S.C. 154(b) by 0 days.

(21) Appl. No.: 18/150,061

(22) Filed: Jan. 4, 2023

(65) Prior Publication Data

US 2023/0212882 A1 Jul. 6, 2023

Related U.S. Application Data

(60) Provisional application No. 63/296,472, filed on Jan. 4, 2022.

(51) Int. Cl.
*E05B 47/02* (2006.01)
*E05B 47/00* (2006.01)
*E05B 47/06* (2006.01)

(52) U.S. Cl.
CPC ........ *E05B 47/026* (2013.01); *E05B 47/0005* (2013.01); *E05B 47/0038* (2013.01); *E05B 47/0615* (2013.01); *E05B 2047/0018* (2013.01); *E05B 2047/0028* (2013.01); *E05B 2047/0084* (2013.01)

(58) Field of Classification Search
CPC .. E05B 47/0005; E05B 47/0038; E05B 47/02; E05B 47/026; E05B 47/0615; E05B 2047/0036; E05B 2047/0081; E05B 2047/0026; E05B 2047/0028; E05B 2047/0084; E05B 2047/0085; E05B 2047/0018
See application file for complete search history.

(56) References Cited

U.S. PATENT DOCUMENTS 4,866,963 A * 9/1989 Leininger ............. E05B 47/026 292/144
4,982,125 A * 1/1991 Shirakawa ............. H02K 29/08 310/68 B
5,610,457 A * 3/1997 Kurita .................... H02K 29/08 310/67 R (Continued)

FOREIGN PATENT DOCUMENTS

CN 105927050 A * 9/2016 ......... E05B 47/0012
CN 104247232 B * 12/2016 ........... H02K 1/2786

(Continued)

OTHER PUBLICATIONS

"How to Power and Control Brushless DC Motors," by DigiKey's North American Editors, Dec. 7, 2016 (Year: 2016).*

(Continued)

*Primary Examiner* — Alyson M Merlino
(74) *Attorney, Agent, or Firm* — Bodman PLC

(57) ABSTRACT

An electronic door lock includes a motor having a stator and a rotor that rotates relative to the stator. The rotor is configured to rotate a spindle operatively coupled to a deadbolt lock at a 1:1 drive ratio therewith. The spindle is engaged with the deadbolt lock to cause extension and retraction with rotation of the spindle.

7 Claims, 12 Drawing Sheets

(56) References Cited

U.S. PATENT DOCUMENTS

| | | | | | |
|---|---|---|---|---|---|
| 5,760,703 | A * | 6/1998 | Becker | E05B 47/0012 235/382 |
| 5,896,769 | A * | 4/1999 | Elpern | E05B 47/0012 70/279.1 |
| 5,931,033 | A * | 8/1999 | Lanigan | E05B 83/12 70/451 |
| 6,417,587 | B1 * | 7/2002 | Komatsu | H02K 29/08 310/68 B |
| 6,919,797 | B2 * | 7/2005 | Hsieh | E05B 47/0012 292/201 |
| 7,010,948 | B1 * | 3/2006 | Hsieh | E05B 47/0012 292/144 |
| 7,017,379 | B1 * | 3/2006 | Hsieh | E05B 47/0012 70/279.1 |
| 7,484,391 | B1 * | 2/2009 | Moore | E05B 47/026 292/155 |
| 7,950,748 | B2 * | 5/2011 | Coutermarsh | E05B 83/02 70/277 |
| 9,321,172 | B2 * | 4/2016 | Johnson | H02K 29/08 |
| 10,693,344 | B2 * | 6/2020 | Purohit | H02K 1/2791 |
| 10,903,723 | B2 * | 1/2021 | Chen | H02K 1/2791 |
| 11,649,656 | B2 * | 5/2023 | Yeo | E05B 47/0012 70/277 |
| 2004/0089037 | A1 * | 5/2004 | Chang | E05B 47/026 70/257 |
| 2015/0300048 | A1 * | 10/2015 | Yen | E05B 47/0012 292/144 |
| 2017/0338715 | A1 * | 11/2017 | Li | H02K 1/2791 |
| 2020/0336027 | A1 * | 10/2020 | Takahashi | H02K 1/2791 |
| 2021/0050766 | A1 * | 2/2021 | Lee | H02K 1/2791 |
| 2022/0388599 | A1 * | 12/2022 | Lee | H02K 21/222 |
| 2023/0079456 | A1 * | 3/2023 | Wang | H02K 1/2791 310/62 |

FOREIGN PATENT DOCUMENTS

| | | | | |
|---|---|---|---|---|
| CN | 106968522 | A | 7/2017 | |
| CN | 206957376 | U | 2/2018 | |
| DE | 10143608 | A1 * | 3/2003 | E05B 47/0012 |
| DE | 10164272 | A1 * | 7/2003 | B04B 7/06 |
| EP | 276037 | A * | 7/1988 | E05B 47/0012 |
| EP | 0408953 | A2 * | 1/1991 | |
| EP | 2779364 | A1 * | 9/2014 | H02K 1/2733 |
| JP | 60059962 | A * | 4/1980 | |
| JP | 60106354 | A * | 6/1985 | |
| JP | 2016086576 | A | 5/2016 | |
| KR | 20050097049 | A * | 10/2005 | |
| KR | 20190074940 | A * | 6/2019 | |
| KR | 20190085688 | A * | 7/2019 | |
| WO | WO-2006057476 | A1 * | 6/2006 | E05B 65/108 |

OTHER PUBLICATIONS

Computer Generated Translation for JP 60106354 A, Generated on Nov. 21, 2025, https://worldwide.espacenet.com/patent/ (Year: 2025).*

* cited by examiner

ELECTRONIC DOOR LOCK WITH DIRECT DRIVE

CROSS-REFERENCE TO RELATED APPLICATION(S)

This application claims priority to and the benefit of U.S. Provisional Application No. 63/296,472, filed Jan. 4, 2022, the entire disclosure of which is incorporated by reference herein.

TECHNICAL FIELD

This disclosure relates to building entry doors and, in particular, electronic door systems and electronic door locks for building entry doors.

BACKGROUND

Electronic door locks may include various mechanisms for operating locks of doors, such as those for building structures. It would be advantageous to provide an electronic door system having an electronic door lock having an actuator that is simplified mechanically to improve reliability.

SUMMARY

Disclosed herein are implementations of electronic door systems, electronic door lock systems, and related methods. In one implementation, an electronic door lock includes a motor having a stator and a rotor that rotates relative to the stator. The rotor is configured to rotate a spindle operatively coupled to a deadbolt lock at a 1:1 drive ratio therewith. The spindle is engaged with the deadbolt lock to cause extension and retraction with rotation of the spindle.

The electronic door lock may further include a thumb turn, the spindle, and/or the deadbolt lock. The thumb turn is configured to be physically engaged by a user to be rotated thereby. The rotor, the spindle, and the thumb turn may be rotationally coupled to rotate at the 1:1 drive ratio. The rotor, the spindle, and the thumb turn may be configured to rotate no more than 225 degrees relative to the stator. The rotor, the spindle, and the thumb turn may be rotatable about a common axis.

In an implementation, an electronic door lock includes a stator assembly and a rotor assembly. The stator assembly includes windings that are operated to create a magnetic fields. The rotor assembly includes a shaft and permanent magnets rotationally fixed to the shaft and that cooperatively rotate relative to the stator assembly. The magnetic fields of the windings interact with permanent magnets to cause rotation of the rotor assembly relative to the stator. The permanent magnets are positioned radially outward of the windings. The shaft extends axially through the stator assembly radially inward of the windings and is rotationally supported by the stator assembly. A distal end of the shaft is configured to rotationally couple to a spindle of a deadbolt lock and transfer torque thereto.

The electronic door lock may further include an adapter and/or a chassis. The adapter may be rotationally coupled to the distal end of the shaft and rotationally coupleable to the spindle of the deadbolt lock. The adapter may be configured to extend axially between and transfer torque between the distal end of the shaft and the spindle. The adapter may rotate the spindle at a 1:1 drive ratio with the shaft and the adapter. The stator assembly may further include a core and stator carrier. The core may include a central aperture and/or include radially extending teeth about which each of the windings is formed.

The stator carrier may include a carrier flange, a tubular portion coupled to the carrier flange, and/or one or more bearings. The tubular portion may extend axially through the central aperture of and be rotationally fixed to the core. The carrier flange may extend radially outward from the tubular portion and be coupled to the chassis. The one or more bearings may be located within the tubular portion and rotationally support the shaft relative to the stator assembly.

The rotor assembly may include a rotor sleeve to which the permanent magnets are coupled, a rotor cap, and/or a thumb turn. The rotor cap may include a rotor flange that is coupled to, extends radially between, and/or transfers torque between the rotor sleeve and the shaft. The rotor flange may include a proximal face and a distal face opposite the proximal face. Thumb turn may be coupled to the proximal face and/or be configured to be physically engaged by a user to rotate the rotor assembly. The shaft may extend extending axially from the distal face.

An electronic door lock includes an electric motor. The electric motor includes a stator having windings and a rotor having permanent magnets and a shaft rotationally fixed to the permanent magnets, which rotate relative to the stator. The permanent magnets are positioned radially outward of the windings. The shaft extends axially through the stator radially inward of the windings, is rotationally supported by the stator, and is configured to rotationally couple to a spindle of a deadbolt lock.

The electronic door lock may include at least three Hall Effect sensors, a motor controller, a position sensor, and/or a position controller. The at least three Hall Effect sensors may be coupled to the stator. The motor controller may be configured to detect an electrical position of the rotor relative to the stator and control the windings according thereto using six step motor control.

The position controller may be configured to detect a physical position of the rotor relative to the stator, to control the stator according to the physical position of the rotor, and/or to limit rotation of the rotor relative to the stator to a range of motion of less than 225 degrees. The range of motion may be determined by the position controller according to another range of motion of the deadbolt.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Referring to the figures, the electronic door system 100 disclosed herein provides access control. The electronic door system 100 may be configured to provide keyless entry (e.g., without a conventional physical key inserted into a lock). The electronic door system 100 may detect touch (e.g., to the deadbolt lock), which is an accurate means of determining intent in a passive keyless system. The electronic door system 100 may further provide user authentication (e.g., via facial recognition, an electronic key, or pin code). If a potential user is not authenticated, access is denied and the electronic door system 100 does not operate the deadbolt lock to unlock the door. The electronic door system 100 may be configured for use with existing lock hardware (e.g., an existing deadbolt lock), or may alternatively include the deadbolt lock.

Figure 1B:
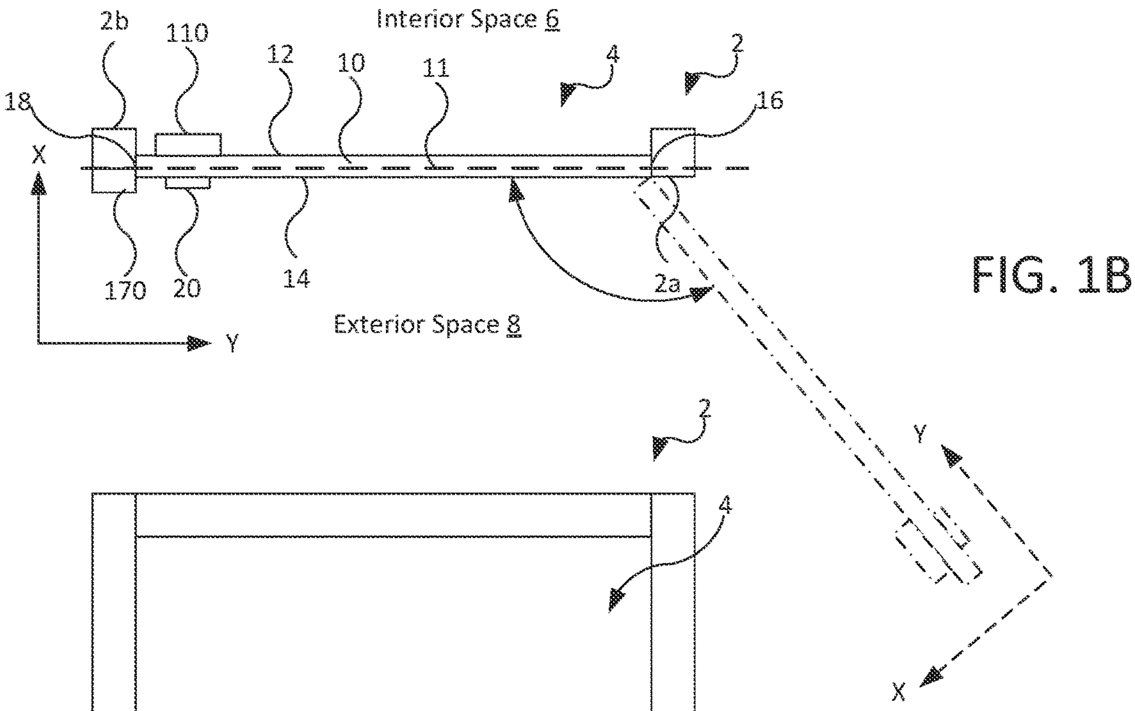
FIG. 1B is a top view of the building structure, door, and electronic door system of FIG. 1B.
Figure 1A:
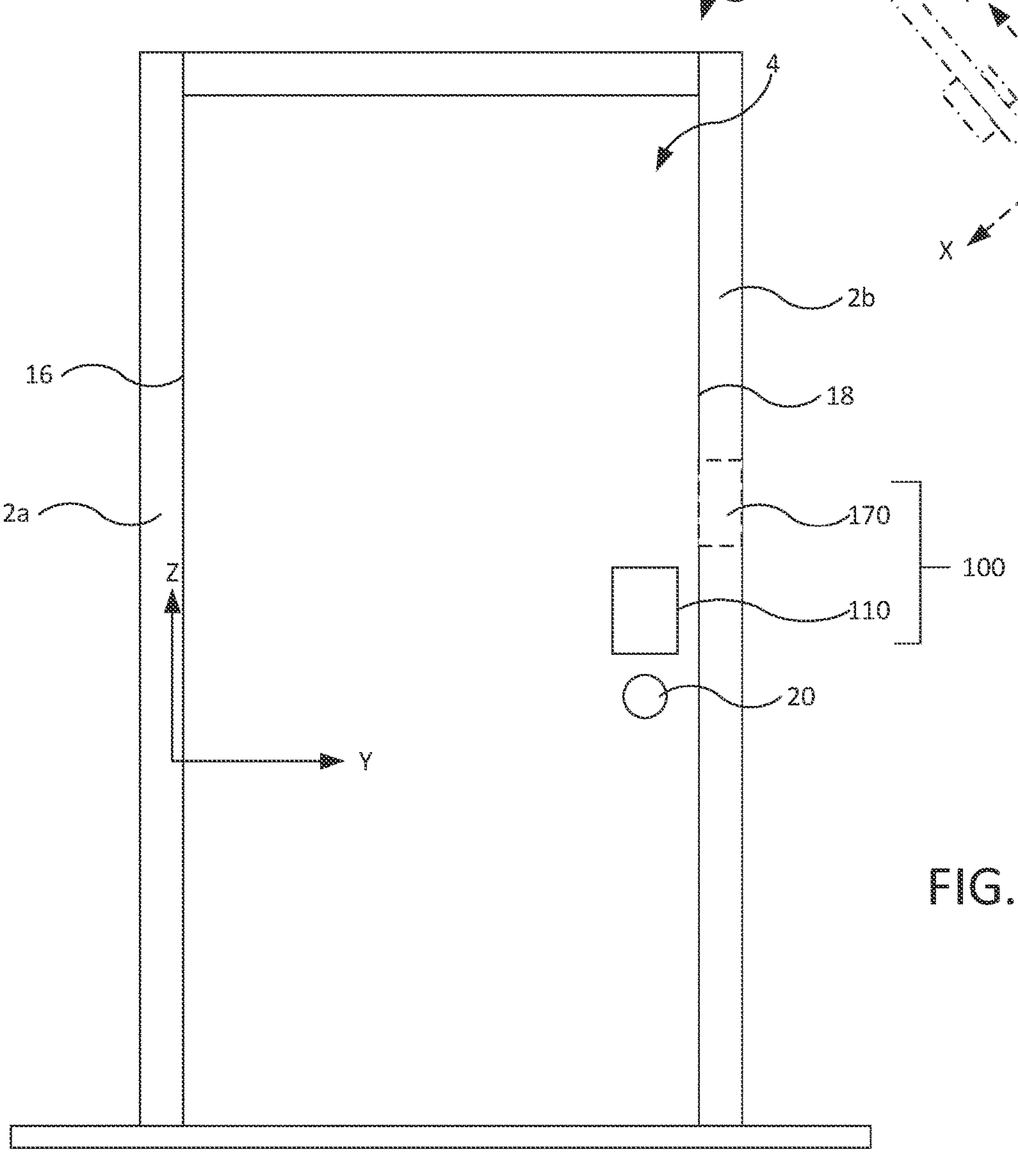
FIG. 1A is a front view of a building structure having a door opening that is closed by a door having an electronic door system.

Referring to FIGS. 1A and 1B, the electronic door system 100 includes the electronic door lock and may further include an authentication device 170. The electronic door lock 110 is coupleable to a door 10 of a building structure 2. The electronic door lock 110 performs various functions related to the door 10, which may include operating a deadbolt lock, detecting touch from a user, locking or disabling the deadbolt lock, assessing a position of the door 10, and/or sensing electronic keys associated with users. The electronic door lock 110 may be configured to operate the deadbolt lock upon detection of touch (i.e., indicating user intent) in combination with detection of an electronic key or authentication of a user. The authentication device 170 is configured to receive inputs for authenticating a user, for example, with facial recognition and/or receiving a pin code.

As shown in FIG. 1B, the building structure 2 generally defines an interior space 6 (e.g., an interior of the building structure 2) that is separated from the exterior space 8 (e.g., the outside environment) by the building structure 2 and selectively separated from the exterior space 8 by the door 10. The door 10 is movable relative to a building structure 2 to selectively close and open a door opening 4 thereof. In FIG. 1B, the door 10 is illustrated in solid lines in a closed physical position and in dashed lines in an open physical position.

The building structure 2 includes a hinge-side jamb 2*a* and a latch-side jamb 2*b* that form the vertical sides of the door opening 4, as well as a head jamb (not labeled) and a sill (not labeled) that define upper and lower horizontal sides of the door opening 4. For example, the building structure 2 may include a door frame that includes the hinge-side jamb 2*a*, the latch-side jamb 2*b*, the head jamb, and the sill. In the case of french doors, the building structure 2 may be considered to include another door that forms the latch-side jamb 2*b* of the door opening 4.

The door 10 includes an interior side 12, an exterior side 14, a hinge edge 16, a latch edge 18, and upper and lower edges (not labeled). The hinge edge 16 is rotationally coupled (e.g., hingedly coupled) to the hinge-side jamb 2*a* of the building structure 2, such that the door 10 is rotatable relative to the building structure 2 about a hinge axis, which is vertical and may also be referred to as the Z-axis (as shown). A direction perpendicular to a plane 11 of the door 10 may be considered the X-axis, while a horizontal direction in the plane 11 of the door 10 may be considered the Y-axis.

While the electronic door system 100 is discussed herein with respect to a building structure 2, it is further contemplated that the electronic door system 100 may be using in other contexts to assess the physical position of a swinging (e.g., hinged structure) relative to another structure (e.g., doors in non-building applications and gates, among other applications).

The electronic door lock 110 is coupleable to the door 10, such that the electronic door lock 110 and the components thereof move as the door 10 is rotated about the hinge axis (i.e., the Z-axis). The electronic door lock 110 may be further coupleable to and/or operatively associated with a deadbolt lock 20 associated with the door 10. Being movable with the door 10, the electronic door lock 110 may use a stored power source (e.g., batteries). The authentication device 170 is coupleable to a non-moving part of the building structure 2, such as the latch-side jamb 2*b*, and may be powered by a continuous power source (e.g., being hardwired to the building).

Figure 2:
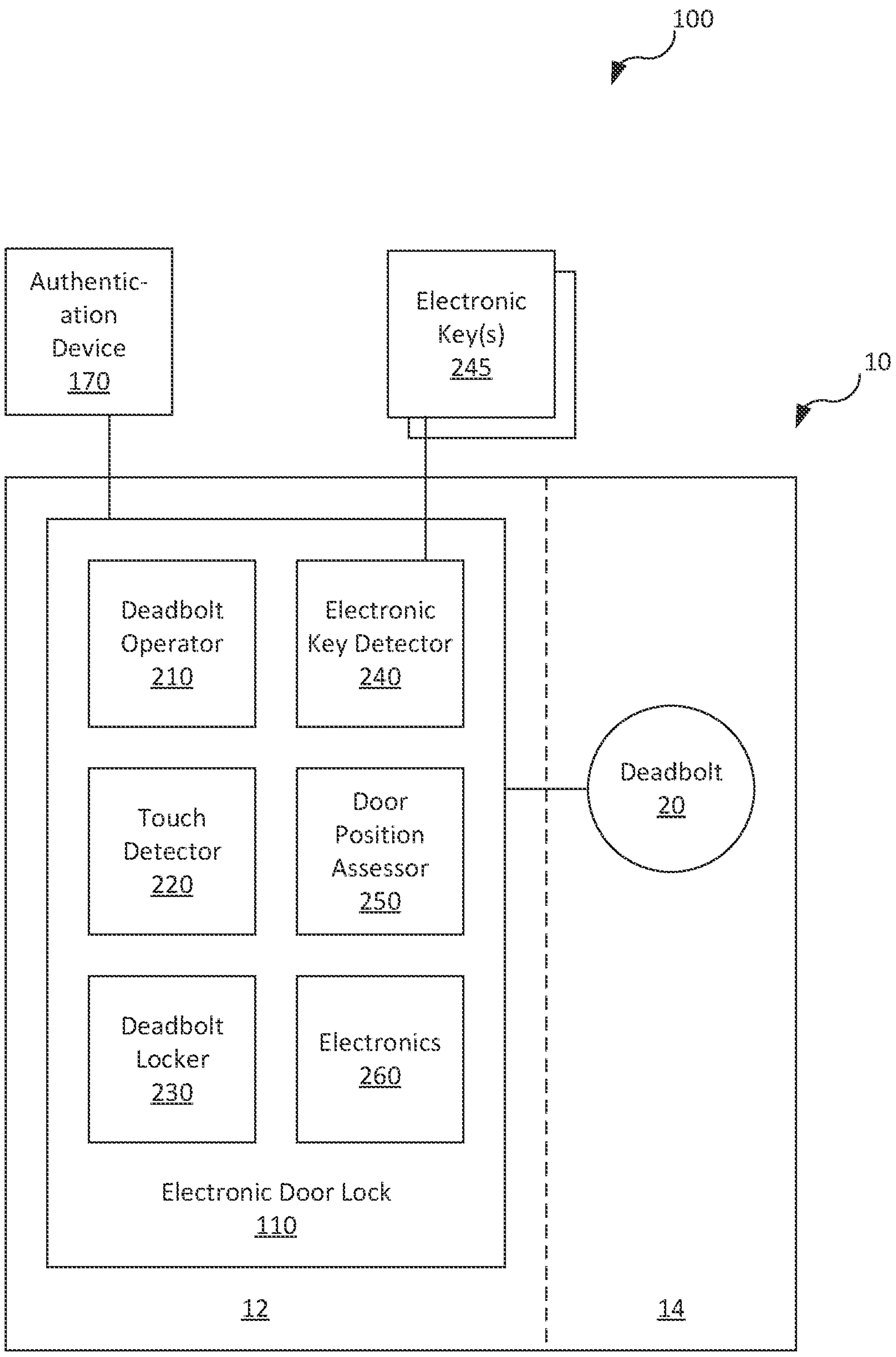
FIG. 2 is a schematic view of a door having the electronic door system of FIGS. 1A-1B and a deadbolt.

Referring to FIG. 2, as referenced above, the electronic door lock 110 is configured to perform various functions related to the door 10, such as operating the deadbolt lock 20. More particularly, the electronic door system 100 may include one or more subsystems of a deadbolt operator 210, a touch detector 220, a deadbolt locker 230, an electronic key detector 240, and/or a door position assessor 250, which may or may not share various components.

The deadbolt operator 210 is configured to operate a deadbolt lock 20 associated with the door 10. The touch detector 220 is configured to detect touch (e.g., on an exterior side 14 of the door 10) and, for example, conductively couples to the deadbolt lock 20 to function as a capacitive electrode of the touch detector 220 for detecting touch capacitively therewith. The deadbolt locker 230 is configured to secure the deadbolt lock 20 by mechanically engaging the deadbolt lock 20 to prevent movement thereof between the locked stated and the unlocked state. The electronic key detector 240 is configured to detect electronic keys 245 associated with the electronic door system 100 and within a detection region, for example, to operate the deadbolt operator 210. The door position assessor 250 is configured to assess the physical position of the door 10, for example, to determine whether the door 10 is closed (i.e., is in the closed physical position). The door position assessor 250, the deadbolt operator 210, the touch detector 220, and the electronic key detector 240 are each discussed in further detail below. As referenced above, the deadbolt operator 210 may operate the deadbolt lock 20, for example, upon receiving an input from the user indicating intent to lock or unlock the door 10 (e.g., upon detection of touch with the touch detector 220) in combination with detecting an electronic key (e.g., with the electronic key detector 240) or authenticating a user (e.g., with the authentication device 170).

It should be noted that the deadbolt operator 210, the touch detector 220, the deadbolt locker 230, the electronic key detector 240, and/or the door position assessor 250 may be provided and/or used in any suitable combination with each other and/or with the deadbolt lock 20. For example, the deadbolt operator 210 may be provided alone or in combination with any one or more of the touch detector 220, the deadbolt locker 230, the electronic key detector 240, and/or the door position assessor 250. The electronic door system 100 may also be referred to as a door position sensor system and an intelligent door status device. When configured to interface with or including the deadbolt lock 20, the electronic door system 100 may also be referred to as an electronic door lock, a locking device, a door locking device, a door locking device, or an electronic door lock system.

The electronic door system 100 further includes electronics 260, which function to operate and may form parts of the deadbolt operator 210, the touch detector 220, the deadbolt locker 230, the electronic key detector 240, and/or the door position assessor 250, for example, each being considered to include and/or share a controller 362 (discussed below) and/or one or more sensors 366. The various subsystems and the electronics may be coupled to each other (e.g., with a chassis, such as a circuit board and/or housing) and, thereby, be cooperatively coupleable to the door 10.

Figure 3:
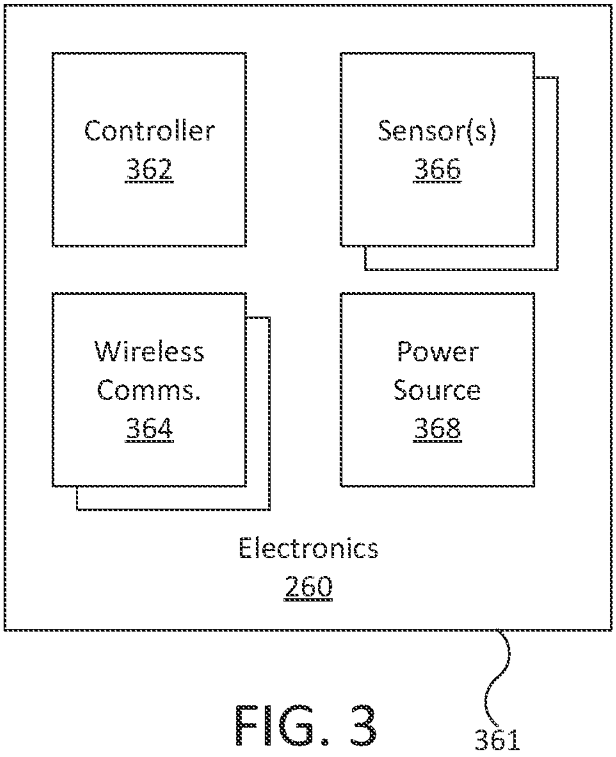
FIG. 3 is a schematic view of electronics of the electronic door system of FIG. 2.

Referring to FIG. 3, the electronics 260 generally include the controller 362, one or more wireless communication devices 364, one or more sensors 366, and a power source 368, which may be mounted to or otherwise coupled (e.g., electrically) to one or more circuit boards 361. The controller 362 is configured to operate the various devices, subsystems, and/or components of the electronic door system 100, for example, being in communication with (e.g., being electrically coupled to) and receiving signals from the wireless communication devices 364 and/or the sensors 366. The wireless communication devices 364 are configured to send to and receive from various other electronic devices signals wirelessly (e.g., the electronic keys 245). The wireless communication devices 364 may, for example, include a transmitter and a receiver coupled to an antenna. The wireless communication devices 364 may communicate according to any suitable wireless communication protocol including, but not limited to, Wi-Fi, Bluetooth, and/or Bluetooth Low Energy (BLE). The sensors 366 are configured to detect various conditions, such as a magnetic field (e.g., including a compass or magnetometer), movement (e.g., including an accelerometer or gyroscope), and/or touch (e.g., capacitance, pressure). The sensors 366 may instead or additionally detect various conditions associated with the deadbolt operator 210, such as the mechanical and/or electrical positions thereof (as discussed in further detail below). Additional ones of the sensors 366 are discussed in further detail below. The power source 368, such as a battery, is configured to provide electric power to the various other electronic components.

Figure 4:
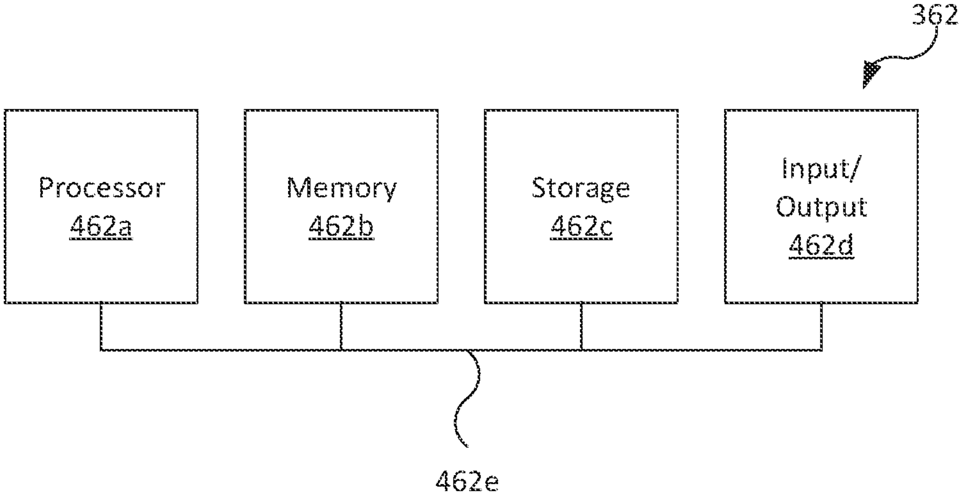
FIG. 4 is a schematic view of an example hardware configuration of a controller of the electronics of FIG. 3.

Referring to FIG. 4, an example hardware configuration of the controller 362 is shown. The controller 362 may be any computing device suitable for implementing the devices and methods described herein. In the example, shown, the controller 362 generally includes a processor 462*a*, a memory 462*b*, a storage 462*c*, an input/output 462*d*, and a bus 462*e* by which the other components of the controller 362 are in communication. The processor 462*a* may be any suitable processing device, such as a central processing unit (CPU), configured to execute instructions (e.g., software programming). The memory 462*b* may be a short-term, volatile electronic storage device, such as a random-access memory module (RAM). The storage 462*c* is a long-term, non-volatile electronic storage device, such as a solid-stated drive (SSD) or other computer-readable medium. The storage 462*c* stores therein instructions (e.g., the software programming), which are executed by the processor 462*a*. The input/output 462*d* is a communication device by which the controller 362 sends and receives signals, for example, to and from the wireless communication devices 364 and the sensors 366. The controller 362 may have any other suitable configuration, for example, being considered to include further processors and/or controllers (e.g., sub-controllers, or a system of controllers) that are associated with the different subsystems and/or sensors described herein (e.g., provided with a chip having one or more of the sensors), such as one or more sub-controllers associated with the deadbolt operator 210.

Figure 5A:
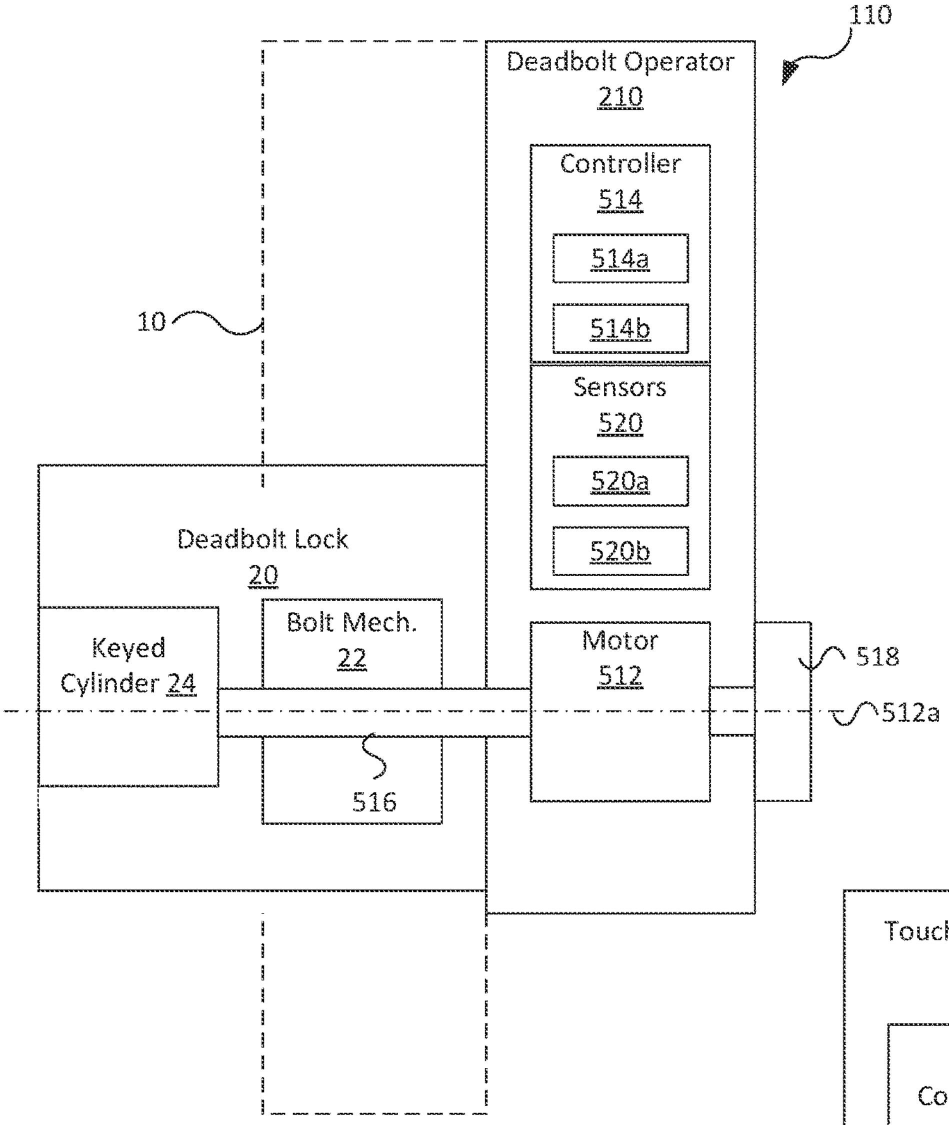
FIG. 5A is a schematic view of a deadbolt operator of the electronic door lock of FIG. 2.

Referring to FIG. 5A, the electronic door system 100 includes the deadbolt operator 210, which may also be referred to as an operator, a deadbolt actuator, or an actuator. As illustrated schematically, the deadbolt operator 210 generally includes a motor 512 and one or more controllers 514, and may further include or otherwise engage a spindle 516 (e.g., a pin, tailpiece, or cam bar), a thumb turn 518, and/or one or more sensors 520. The deadbolt operator 210 is configured to operate the deadbolt 20. More particularly, the motor 512 is operatively coupled to or otherwise engages the spindle 516 to transfer torque thereto and cause rotation thereof. The spindle 516, in turn, is operatively coupled to or otherwise engages a deadbolt mechanism 22 of the deadbolt lock 20, such that rotation of the spindle 516 by the motor 512, the thumb turn 518, or a keyed cylinder 24 (e.g., an external manual operator) of the deadbolt lock 20 operates the deadbolt mechanism 22 (e.g., causing extension and retraction of a bolt 22*a* thereof). A further description of the deadbolt mechanism 22 is provided below with respect to FIGS. 7B and 7C.

The motor 512 may, as described in further detail below, be a direct current brushless motor, which may also be referred to as a brushless DC motor or a BLDC, a permanent magnet alternating current motor, which may be referred to as a PMAC, or other suitable type of motor. As discussed in further detail below, the motor 512 may have a 1:1 drive ratio with the spindle 516, rotate about a common axis with the spindle 516, and/or may rotate within a rotational range of motion that is less than 360 degrees, which may simplify the electronic door lock 110 relative to conventional electronic door locks, so as to improve reliability and/or reduce noise compared thereto.

The controller 514 controls operation (e.g., rotation) of the motor 512 and, thereby, controls operation of the deadbolt lock 20. The controller 514 may be the controller 362 that functions to operate the door position assessor 250 and/or other subsystems of the electronic door system 100 or another controller. The controller 514 may include sub-controllers, such as a motor controller 514*a* (i.e., that operates the motor 512 according to a motor control methodology, such as six step motor control, as is recognized in the art) and a position controller 514*b* (i.e., that operates the motor 512 according to the rotational position of the motor 512). The deadbolt operator 210 may also be considered to include one or more of the sensors 520 (e.g., one of the sensors 366) for assessing operation of the deadbolt 20 (e.g., a magnetic or optical sensor for determining whether the deadbolt 20 is extended or retracted), the electrical position of the motor 512 (e.g., with electrical position sensors 520*a*, such as Hall Effect sensors), and/or the rotational position of the motor 512 (e.g., with a rotational position sensor 520*b*). Instead or additionally, the controller 514 may be configured to determine whether the deadbolt operator 210 is capable of operating the deadbolt 20, for example, determining that the deadbolt 20 is not operable if after a certain duration of attempting to move the deadbolt 20, the deadbolt has not moved to the extended position (e.g., if the deadbolt 20 is engaging the door jamb) or if the motor 512 is drawing high electricity (e.g., current).

The spindle 516 may be provided as part of the deadbolt operator 210 (e.g., with the electronic door system 100), or may instead be provided as part of the deadbolt lock 20 and operatively coupleable to the deadbolt operator 210 (e.g., a receptacle that is rotatable by the motor 512).

The thumb turn 518 is configured to be physically engaged by a user to be rotated thereby and, in turn, transfer torque to and cause rotation of the motor 512 (i.e., the rotor thereof) and, further in turn, transfer torque to and rotate the spindle 516 to operate the deadbolt mechanism 22.

As referenced above, the motor 512 may be rotationally coupled to and configured to have a 1:1 drive ratio with the spindle 516. After free play (e.g., slack in the mechanical stackup) in the rotational interfaces within and extending between the deadbolt mechanism 22 and the motor 512 is account for, the 1:1 drive ratio provides that the motor 512 and the spindle 516 have substantially the same torque output and may further provide that the motor 512 and the spindle 516 rotate the same amount and/or at the same speed (e.g., a common speed). For example, the deadbolt operator 210 may not include a gear reduction between the motor 512 and the spindle 516 to achieve the 1:1 drive ratio.

The thumb turn 518 is rotationally coupled to the motor 512 (e.g., to the rotor) thereof) and, thereby, to the spindle 516. That is the motor 512 (e.g., the rotor thereof), the spindle 516, and the thumb turn 518 are rotationally coupled to each other. The thumb turn 518 may have a 1:1 drive ratio with the motor 512 and, in turn, have the 1:1 drive ratio with the spindle 516. In other embodiments, the deadbolt operator 210 may include a gear reduction mechanism (e.g., a planetary gear set) that reduces the relative speed and increase the torque output by the spindle 516 relative to the motor 512.

As also reference above and as shown in FIG. 5A, the motor 512 and the spindle 516 may rotate about a common axis 512*a*, which is referred to herein as the rotor axis 512*a*. The thumb turn 518 and any intervening components between the motor 512 and the spindle 516 may also rotate about the rotor axis 512*a*, such as the planetary gear set (as referenced above) or an adapter between the motor 512 and the spindle 516.

The motor 512 may be configured to rotate over an angular range of motion that is less than 360 degrees, such as less than 270 degrees, less than 225 degrees, less than 180 degrees, or less than 135 degrees. The angular range of motion of the motor 512 generally corresponds to the angular range of motion for operating the deadbolt mechanism 22 and the free play within the system between the deadbolt mechanism 22 and the motor 512. The angular range of motion of the motor 512 may, for example, be controlled by the controller 514 according to position detected by the one or more sensors 520 (e.g., the rotational position sensor 520*b*) as determined during a calibration process. For example, during such a calibration process, the controller 514 (e.g., the position controller 514*b*) may detect the rotational positions of the motor 512 (e.g., with the rotational position sensor 520*b*) that correspond to the fully extended and fully retracted positions of the deadbolt mechanism 22. The calibration process may include applying a substantially constant torque output with the motor 512 (e.g., by supplying a constant current thereto), while measuring the rotational position of the motor 512 and determining those rotational positions at which rotational movement stops despite applying the constant torque.

The free play generally refers to rotational motion of one component or mechanism that does not result in movement of another component or mechanism operatively coupled directly or indirectly thereto. Free play may, for example, be within the deadbolt mechanism 22, between the deadbolt mechanism 22 and the spindle 516, between the spindle 516 and the motor 512, and/or any intermediate interfaces therebetween (e.g., between each of the motor 512 and the spindle 516 and an adapter, which is discussed in further detail below). Conventional deadbolt mechanisms 22 may, for example, have a range of motion of between 75 and 135 degrees (e.g., between approximately 90 and 110 degrees) to move a bolt 22*a* of the deadbolt mechanism 22 (see FIGS. 7B and 7C and related discussion) between fully extended and fully retracted positions. Free play between the deadbolt mechanism 22 and the motor 512 may, for example, be between 0 and 90 degrees. As a result, the motor 512 may rotate up to approximately 225 degrees (e.g., up to approximately 180 degree or up to approximately 135 degrees) to operate the deadbolt mechanism 22 to move the bolt 22*a* between the fully extended and fully retracted positions. Thus, the controller 514 may rotate the motor 512 within a range of motion that is 270 degrees or less, 225 degrees or less, 180 degrees or less, or 135 degrees or less.

Figure 5B:
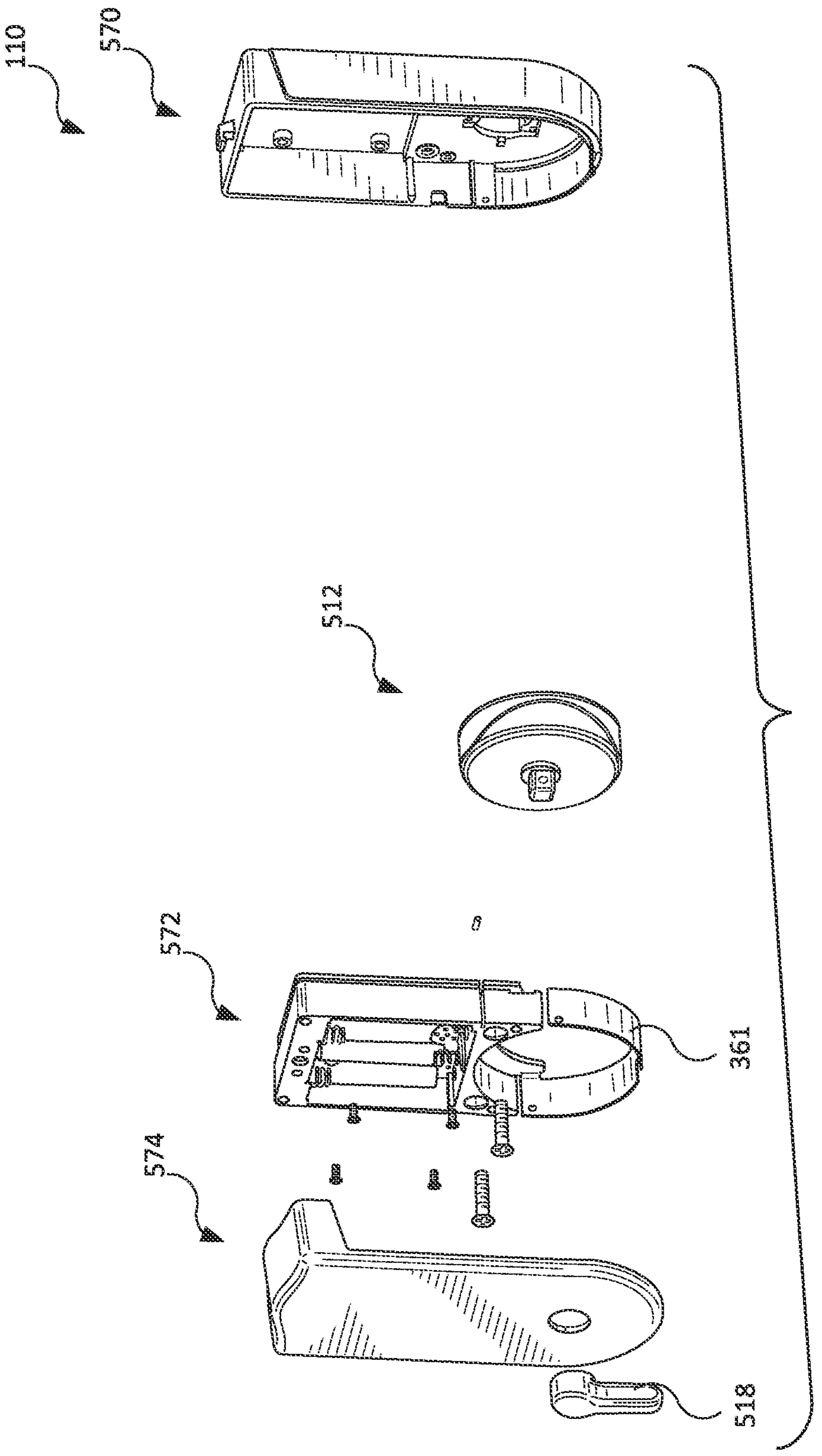
FIG. 5B is an exploded perspective view of the electronic door lock.
Figure 5C:
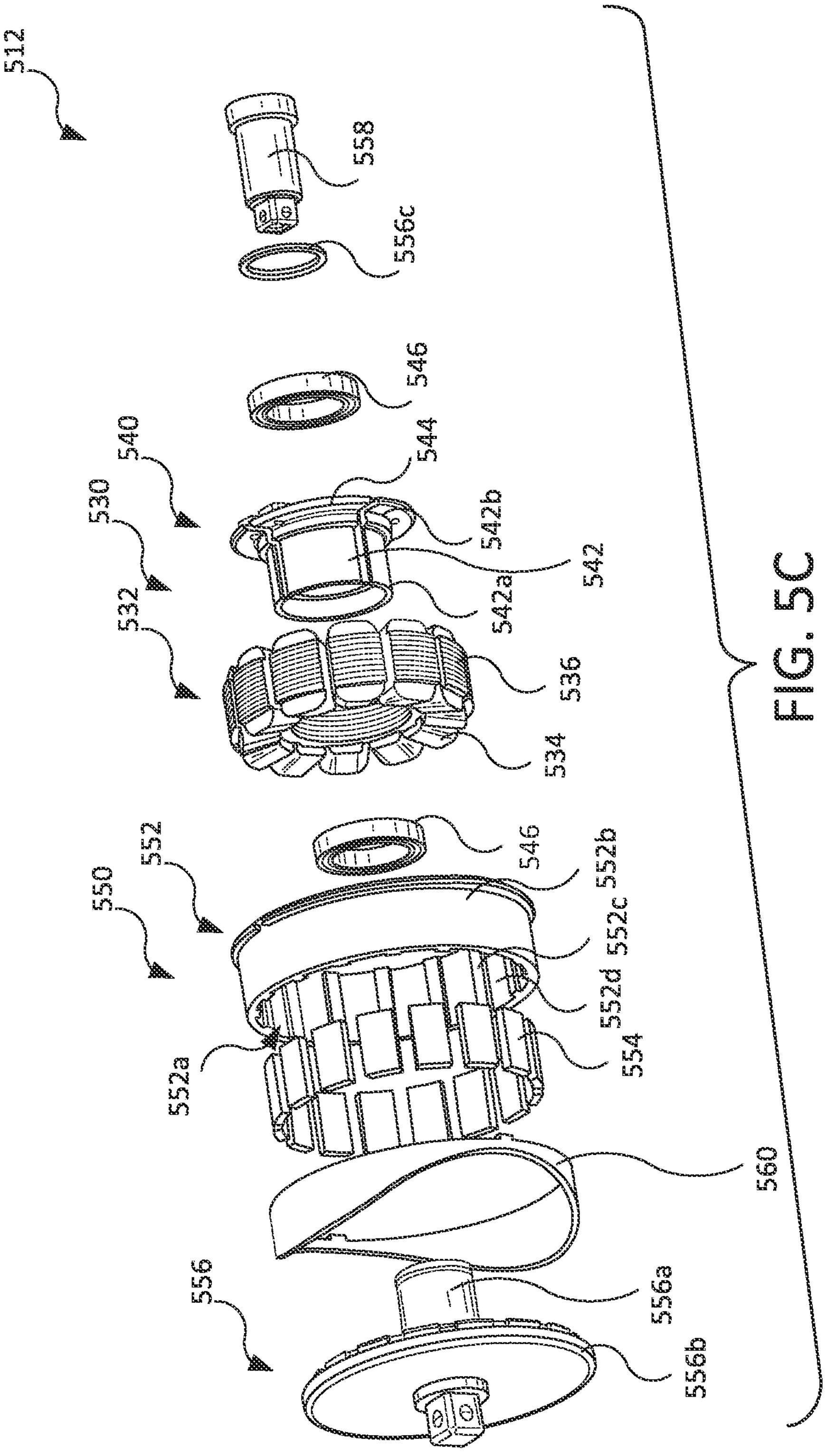
FIG. 5C is an exploded view of a motor of the electronic door lock and the deadbolt operator.

Referring to FIGS. 5B and 5C, respectively, the electronic door lock 110 and the motor 512 are depicted in exploded views. As shown in FIG. 5B, the electronic door lock 110 generally includes the motor 512, the thumb turn 518, a chassis 570 (e.g., a backing plate or rear housing), an electronics module 572, which may be considered to include one or more of the circuit boards 361, and a cover 574 (e.g., a front housing). The chassis 570 forms a primary structure to which are coupled and/or that contains other components of the electronic door lock 110, such as the motor 512, the electronics module 572, and one or more of the circuit boards 361. The chassis 570 may couple directly to the deadbolt 20 to be coupled to the door 10 directly or indirectly (e.g., with a mounting plate; not shown). The motor 512 is coupled to the chassis 570 via the stator carrier 540 (e.g., via screws connecting to the flange 544). The electronics module 572, which may include the electronics 260 described previously, is positioned in and/or coupled to the chassis 570 (e.g., via screws). The electronics module 572 may, for example, include one of the circuit boards 361 contained therein and/or include the power source 368 (e.g., being configured to receive conventional batteries). The electronics module 572 may receive and/or extend around the motor 512. One of the circuit boards 361, or the only circuit board 361, may be configured as flexible circuit board that extends around the motor 512. The flexible circuit board 361 may include the rotational position sensor 520*b*, which measures a target 560 (as discussed in further detail below) of the rotor 550 to determine the mechanical position thereof. The cover 574 is removably coupleable to the chassis 570, so as to cover the electronics module 572 and the motor 512 from view. The cover 574 may include an aperture through which the thumb turn 518 is connected to the motor 512 (e.g., via a male/female interface as shown, fasteners, or any other suitable connection).

Referring to FIG. 5C, the motor 512 for the electronic door lock 110, as referenced above, may be configured as a BLDC or PMAC motor. The motor 512 generally includes a stator 530 and a rotor 550 that rotates relative to the stator 530. As shown, the rotor 550 is positioned radially outward of the stator 530, which may be referred to as an out-runner motor configuration. Alternatively, the rotor 550 may be positioned radially inward of the stator 530, which may be referred to as an in-runner motor configuration.

The stator 530, which may also be referred to as a stator assembly, generally includes a stator stack 532 and a stator carrier 540. The stator stack 532 generally includes a stator core 534 and a plurality of windings 536.

The stator core 534 of the stator stack 532 includes a plurality of plates (e.g., laminations) that are laminated together to form the stator core 534. The plates may, for example, be formed of steel. The stator core 534 defines an inner periphery and an outer periphery. The inner periphery may, for example, be substantially circular and/or include mating features that engage the stator carrier 540 to prevent relative rotation therebetween. The stator core 534 includes a plurality of teeth extending radially outward to the outer periphery and which define therebetween a plurality of slots extending radially inward from the outer periphery.

Each of the windings 536 is formed around one of the teeth of the stator core 534. Each of the windings includes magnet wire that is wrapped around one of the teeth of the stator core 534 a number of turns. The motor 512 may be configured as a three-phase motor in which case the windings are arranged in one of three different electrical phases, each phase having the same number of windings, and being operated to output a magnetic field that interacts with the rotor 550 (e.g., the permanent magnets 554 thereof) to cause rotation thereof.

The stator stack 532 may be configured, among other parameters, according to the number of windings 536, the number of pole pairs formed thereby, and the number of turns within each such winding 536. The stator stack 532 may include the windings 536, where n is the total number of the windings 536, which is equal to the number of teeth of the stator core 534 and the number of slots therebetween. In one specific example shown, the stator stack 532 includes twelve of the windings 536, four of the windings 536 for each of the three electrical phases. Lower and higher numbers of windings 536 and pole pairs are contemplated, for example, the stator 530 may include three, six, nine, 15, 18, 21, 24, or more windings 536. Each of the windings may include, for example, approximately 80 turns of the magnet wire. Lower and higher numbers of turns are contemplated for each of the windings 536, such as between 20 and 100 turns (e.g., 20 to 40 turns, 30 to 50 turns, 40 to 60 turns, 50 to 70 turns, 60 to 80 turns, 70-90 turns, 80-100 turns, or more).

Other parameters according to which the stator stack 532 may be configured include the inner diameter, the outer diameter, material of the stator core 534, the number of laminations of the stator core 534, and the gauge of the magnet wire forming the windings 536.

The stator stack 532 may additionally include the electrical position sensors 520*a*, which may be considered the sensors 366, and are used for motor control (i.e., for commutating the windings 536). The commutation angle is equal to 60 degrees divided by the number of pole pairs of the rotor 550. For example, for a rotor 550 having four pole pairs, the commutation angle is 15 degrees, which using six step motor control, requires commutating the windings 536 with the motor controller 514*b* (i.e., changing the energizing of the windings 536) every 15 degrees of mechanical rotation of the rotor 550. Each of the three electrical position sensors 520*a* are Hall Effect sensors positioned at locations circumferentially between consecutive windings 536 (e.g., in the slots therebetween). Other methods of motor control may be used, for example, field oriented control (FOC).

The stator carrier 540 is configured to mount the stator 530 to the chassis 570 of the electronic door lock 110 and prevent rotation therebetween and, thereby, between the door 10 and the stator 530. The stator carrier 540 is further configured to rotationally mount the rotor 550 to the stator 530.

The stator carrier 540 generally includes a tubular portion 542 and a flange 544. The tubular portion 542 may also be referred to as an axially-extending portion or a first portion, while the flange 544 may also be referred to a flange portion, radially-extending, or second portion. The tubular portion 542 extends axially (i.e., along the motor axis 512*a*) from the flange 544. For example, as shown, the tubular portion 542 may be substantially tubular and extend between proximal end 542*a* and a distal end 542*b*.

The tubular portion 542 is coupled to the stator 530 to prevent movement therebetween. The proximal end of the tubular portion 542 is received by the inner periphery of the stator core 534. The tubular portion 542 may be press-fit into the stator core 534 and/or include mating features (e.g., splines and/or slots; shown, not labeled) on an outer periphery thereof that are received by corresponding mating features of the inner periphery of the stator core 534 (e.g., slots or splines, respectively; shown, not labeled) to prevent relative rotation therebetween.

The flange 544 extends radially outward (i.e., radially outward relative to the motor axis 512*a*) from the distal end 542*b* of the tubular portion 542. The flange 544 is coupled to the chassis 570 of the electronic door lock 110, for example, with screws or other fasteners.

The stator carrier 540 may be made from any suitable material, such as stainless steel or other non-magnetic material. The stator carrier 540 may be a unitary component that includes both the tubular portion 542 and the flange 544, or may the tubular portion 542 and the flange 544 separately formed and coupled together.

The stator carrier 540 is further configured to rotationally support the rotor 550. For example, the stator carrier 540 includes one or more bearings 546 that support a shaft of the rotor 550 (discussed below). For example, the stator carrier 540 may include two of the bearings 546, one of the bearings 546 positioned at each of the proximal end 542*a* and the distal end 542*b* of the tubular portion 542 of the stator carrier 540. The bearings 546 may be press fit or otherwise fixedly coupled to the proximal end 542*a* and the distal end 542*b*, which may include radially extending flanges (e.g., seats) against which the bearings 546 are pressed (e.g., seated) to orient the bearings 546 relative to the stator carrier 540 to define the motor axis 512*a*.

The rotor 550, which may be referred to a rotor assembly, generally includes a rotor sleeve 552, permanent magnets 554, and a rotor shaft assembly 556.

The rotor sleeve 552 is coupled to and supports the permanent magnets 554 radially outward of the windings 536 of the stator 530. The rotor sleeve 552 includes an inner periphery 552*a* and an outer periphery 552*b*. The inner periphery 552*a* includes teeth 552*c* that extend radially inward to define the inner periphery 552*a* and that define slots 552*d* therebetween. The slots 552*d* extend radially outward from the inner periphery 552*a*. The permanent magnets 554 are positioned in the slots 552*d* and coupled to the rotor sleeve 552 to transfer force thereto. Edges of the permanent magnets 554 may engage one or both teeth 552*c* on either side thereof to transfer force thereto and/or may be adhered to the rotor sleeve 552. Each of the slots 552*d* includes a radially-inward facing surface (e.g., extending between the teeth 552*c* on either side thereof) and which are adhered to radially-outward facing surfaces of the permanent magnets 554. The radially-inward facing surfaces of the slots 552*d* may be planar and complement the radially-outward facing surfaces of the permanent magnets 554, so as to properly position and orient the permanent magnets 554 relative to each other and the rotor sleeve 552.

The rotor sleeve 552 may, for example, be formed of carbon steel via a casting and/or machining process. A machining process may be used to form the inwardly-facing, planar surfaces of the slots 552*d*. For example, the rotor sleeve 552 may be formed from laminations (e.g., similar to the stator core 534) and, furthermore, the laminations forming the stator core 534 and the rotor sleeve 552 may be formed simultaneously (e.g., with laminations of the stator core 534 and the rotor sleeve 552 being formed concentrically within the same piece of material, such as via a stamping or other suitable operation).

The permanent magnets 554 are arranged in alternating polarity moving circumferentially around the rotor sleeve 552. Two of the permanent magnets 554 of opposite polarity may be considered to form a pole pair. The permanent magnets 554 may, for example, be rare earth magnets, such as neodymium magnets. The permanent magnets 554 may each be rectangular having a thickness, a width that is greater than the thickness, and a length that is greater than the width. The length may extend parallel with the motor axis 512*a*, while the width may extend generally circumferentially partially around the motor axis 512*a*. As referenced above, the radially-outward facing surface of the permanent magnets 554 may be planar.

The rotor shaft assembly 556 is coupled to the rotor sleeve 552 and is configured to transfer torque from the rotor sleeve 552 to the spindle 516 of the deadbolt 20. For example, the rotor shaft assembly 556 may generally include a tubular portion 556*a* and a flange 556*b*. The tubular portion 556*a*, which may also be referred to as an axially-extending or first portion, rotor shaft, or shaft, is elongated along the motor axis 512*a*, extending from a proximal end thereof adjacent the flange 556*b* to a distal end. The proximal end of the tubular portion 556*a* is coupled to and extends axially from a distal face of the flange 556*b*. The tubular portion 556*a* extends through the stator 530 and is rotationally supported by the bearings 546 and, thereby, the stator carrier 540. The tubular portion 556*a* may have a substantially cylindrical outer periphery (e.g., being tubular or a cylindrical solid), so as to complement and be received by a circular inner periphery of the bearings 546. The distal end of the tubular portion 556*a* may extend beyond the flange 544 of the stator carrier 540, so as to receive a clip 556*c* (e.g., a retention ring or C-clip) in a circumferential slot thereof (shown now labeled) that prevents axial movement between the rotor 550 and the stator 530.

The distal end of the tubular portion 556*a* is further configured to transfer torque, directly or indirectly, from the rotor 550 to the spindle 516 of the deadbolt 20. The rotor 550 may include an adapter 558 that is removably coupleable to, extends axially between, and transfers torque between the distal end of the tubular portion 556*a* and the spindle 516 of the deadbolt 20. The electronic door lock 110 may be provided with multiple different versions of the adapter 558 that are configured to couple to and engage different spindles 516 for different manufacturers and/or to account for different thicknesses of doors 10, for example, having different lengths and/or different end shapes (e.g., receptacles) for receiving and rotationally engaging the spindle 516. The adapter 558 may be configured to couple to the tubular portion 556*a* of the rotor shaft assembly 556 in any suitable manner, for example, being configured as a male member that is inserted axially into a female receptacle of the tubular portion 556*a* with complementary shape to transfer torque therebetween (e.g., square, hexagonal) and/or with one or more retention features that retain the adapter 558 axially to the rotor shaft assembly 556 (e.g., ball and spring detent interface). Alternatively, the adapter 558 may be omitted in which case the spindle 516 directly engages the tubular portion 556*a* of the rotor 550 and the deadbolt mechanism 22.

As referenced above, in certain embodiments, the motor 512 is configured to transfer torque to the spindle 516 in a 1:1 drive ratio, which may be facilitated by direct engagement of the rotor 550 with the spindle 516 or with the adapter 558 that engages each of the rotor 550 and the spindle in a 1:1 drive ratio. Thus, the rotor 550, the adapter 558, and the adapter 558 are rotationally coupled to each other and transfer torque therebetween in a 1:1 drive ratio. Furthermore, the rotor 550 is configured to rotate about the rotor axis 512*a*, along with the spindle 516 and the adapter 558.

The flange 556*b*, which may also be referred to as a flange or second portion, or a rotor flange, is coupled to the proximal end of the tubular portion 556*a* and the rotor sleeve 552. The flange 556*b* is coupled to and extends radially between the tubular portion 556*a* and the rotor sleeve 552 to transfer torque therebetween. For example, the radially-extending portion may be received by the rotor sleeve 552 and include teeth (shown; not labeled) that extend radially inward and are received by the slots 552*d* of the rotor sleeve and circumferentially engage the teeth 552*c* to transfer torque therebetween.

The rotor shaft assembly 556 may, for example, be a unitary, injection molded plastic component that includes both the tubular portion 556*a* and the flange 556*b*. Alternatively, the rotor shaft assembly 556 may be formed of multiple components coupled to each other, one or more other manufacturing methods, and/or different materials or combinations of materials (e.g., metal).

The rotor shaft assembly 556 may further include or be configured to couple to the thumb turn 518. In particular, the thumb turn 518 is coupled to a proximal face of the flange 556*b*. The thumb turn 518, as referenced above, is manually manipulatable (e.g., rotatable) by the user to turn the spindle 516 of the deadbolt 20. More particularly, torque is transferred from the thumb turn 518 to the rotor 550 (e.g., by the rotor shaft assembly 556) to the spindle 516 of the deadbolt 20. As referenced above, the thumb turn 518 may have a 1:1 drive ratio with the rotor 550, the spindle 516, and any adapter 558 (if provided).

As referenced above, the deadbolt operator 210 may be configured to limit rotation of the motor 512 to a range of motion that is 270, 225, 180, or 135 degrees or less. More particularly, the controller 514 (e.g., the position controller 514*b* thereof) senses the mechanical position of the rotor 550 relative to the stator 530 with one of the sensors 520 (e.g., the rotational position sensor 520*b*). The rotational position sensor 520*b* may be configured as an encoder that measures inductance of a target 560 on the rotor 550. As mentioned above, the rotational position sensor 520*b* may be coupled to the flexible circuit board 361 that extends around the rotor 550 and is in close proximity to the target 560. The rotational position sensor 520*b* may include one inductance sensor for measuring inductance at one location or may include two inductance sensors at 90 degrees apart.

The target 560 may be configured as a ring with an inductive material (e.g., aluminum) and extend circumferentially around and be rotationally coupled to the rotor sleeve 552. The target 560 varies the amount of aluminum or other inductive material at different rotational locations, such that the different inductance measured by the rotational position sensor 520*b* indicates a different rotational position of the rotor 550 relative to the stator 530.

Figure 5D:
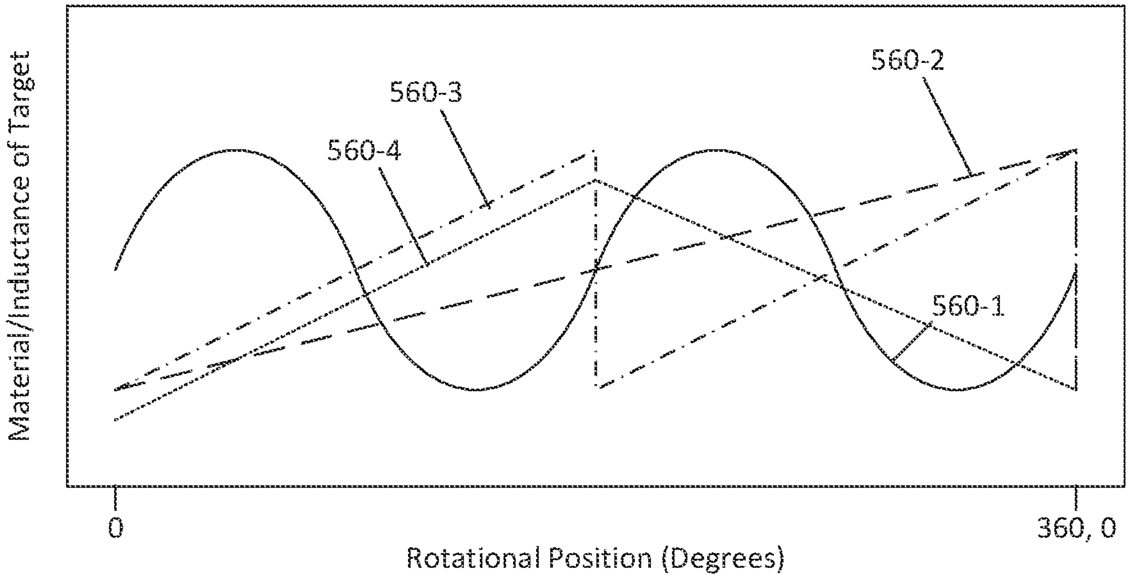
FIG. 5D is a graph representing material and/or inductance of a target for measuring a physical position of the motor.

As referenced above, the amount of the inductive material (e.g., the shape) of the target 560 varies moving circumferentially about the rotor 550. The material and/or shape of the target 560 may be provided in a periodic manner (e.g., sinusoidal, as shown). Other configurations are contemplated, which include two 180 degree linear ramps with steps therebetween, or a 360 degree ramp with a step between the beginning and end thereof. Those targets 560 having periodic material or shape may have more mass balance about the motor axis 512*a* but may have less resolution (e.g., the same amount of material and measurable inductance corresponding to more than one rotational location, such as two or four locations as shown). For example, FIG. 5D illustrates the relative amount of material and, therefor, relative inductance output for the sinusoidal target 560-1 shown in FIG. 5C, a single-ramp target 560-2, a double-ramp target 560-3, and a ramp up and down target 560-4. In the case of the ramp up and down target 560-4, the rotational position sensor 520*b* may include two inductance sensors that measure inductance at two locations 90 degrees apart, which may be used to determine both the physical rotational position of the rotor 550 (and thereby the bolt 22) and direction of rotation.

Figure 6A:
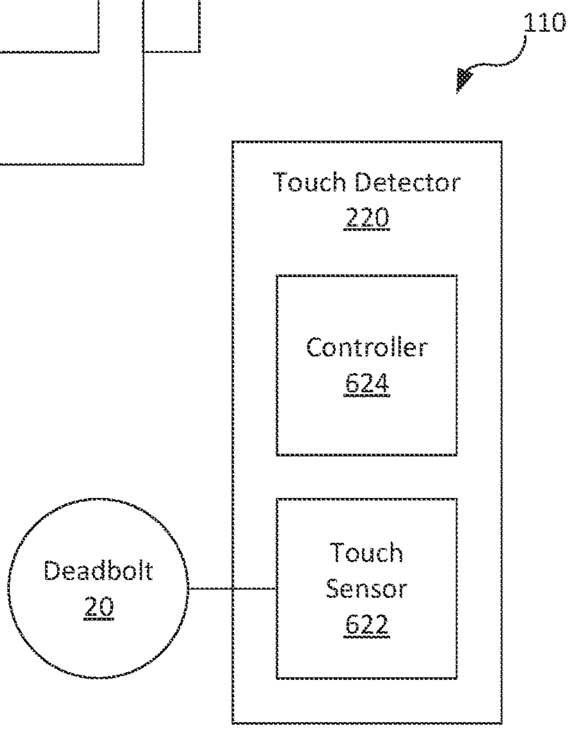
FIG. 6A is a schematic view of a touch detector of the electronic door system of FIG. 2.
Figure 6C:
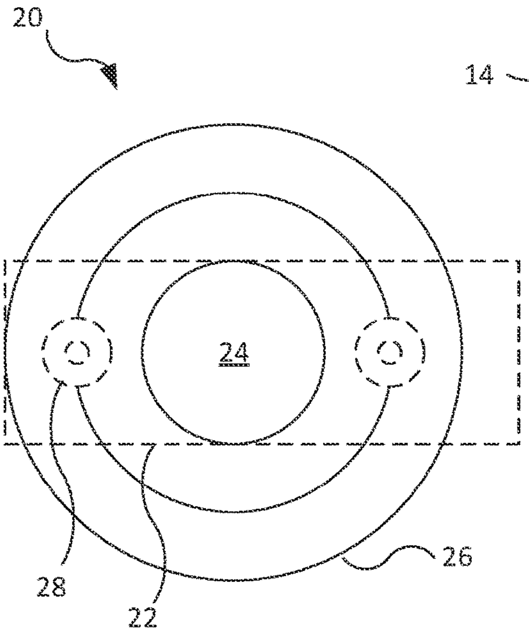
FIG. 6C is a front view of the deadbolt lock of FIG. 6B with hidden components depicted in dashed lines.
Figure 6D:
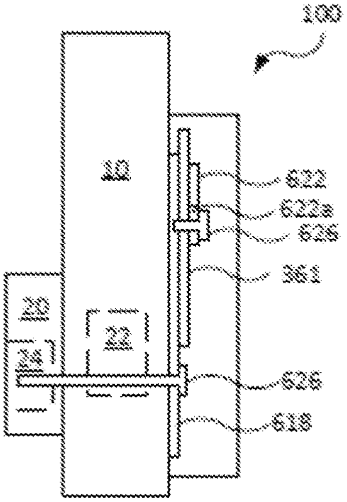
FIG. 6D is partial cross-sectional view of another embodiment of the electronic door system having the touch detector of FIG. 6A and being coupled to a door.
Figure 6B:
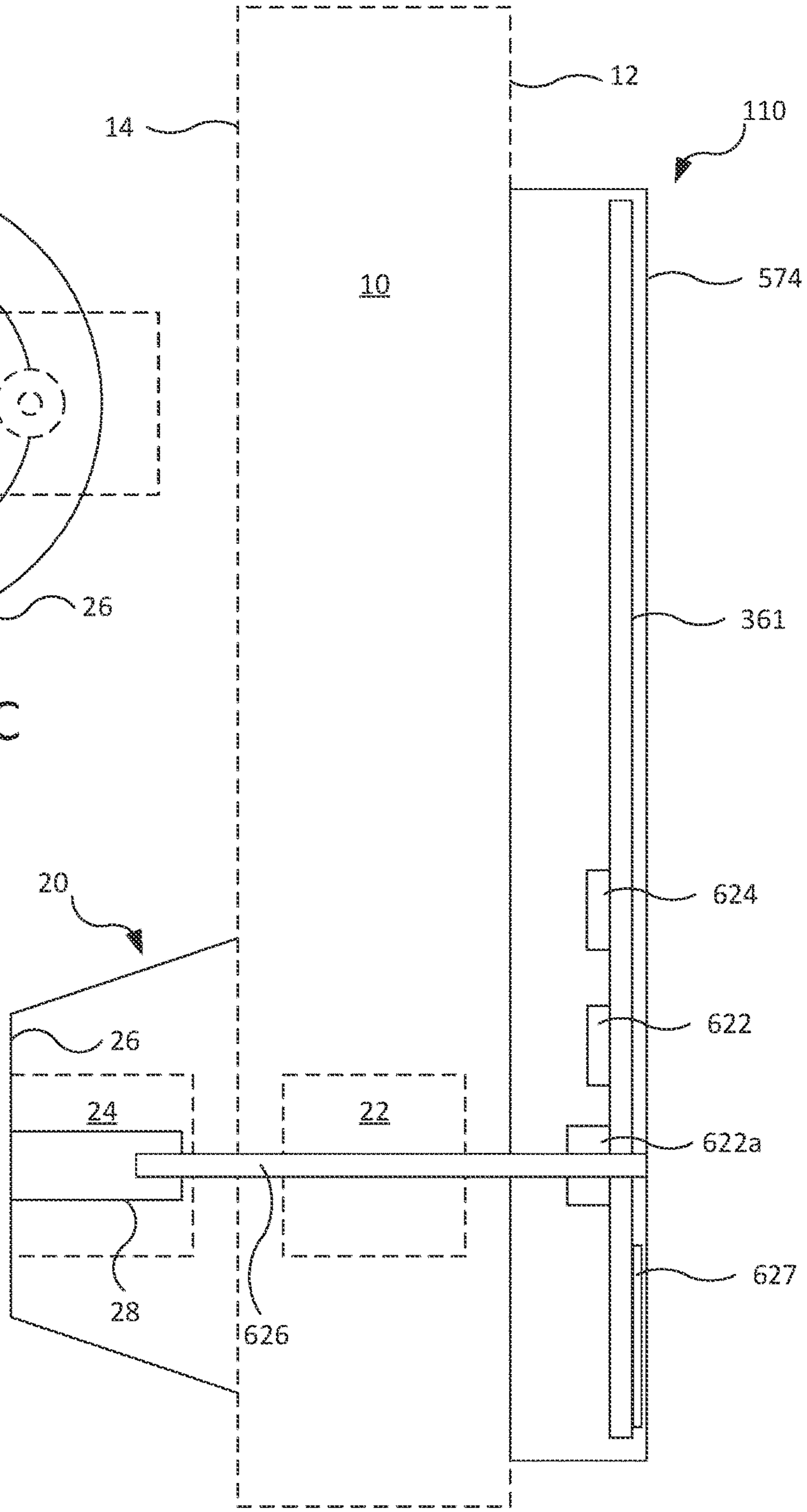
FIG. 6B is a partial cross-sectional view of the electronic door system having the touch detector of FIG. 6A and being coupled to a deadbolt lock and a door.

Referring to FIGS. 6A-6C, the electronic door system 100 may include the touch detector 220. The touch detector 220 is configured to detect touch, which may be indicative of a user's intent to unlock the deadbolt lock 20 to open the door 10. The touch detector 220 generally includes a touch sensor 622 and a controller 624. The touch sensor 622 is configured to sense touch on the exterior side 14 of the door 10. The controller 624 is electrically coupled to the touch sensor 622, so as to receive and interpret signals therefrom to determine whether a touch has been detected. In a preferred example, the touch sensor 622 is configured to measure capacitance, and the controller 624 determines touch based on the measured capacitance (e.g., if capacitance exceeds a threshold). The touch sensor 622 may be one of the sensors 366 that is used by and/or considered part of another subsystem (e.g., the door position assessor 250), while the controller 624 may be the controller 362 (or another controller).

The touch detector 220 is further configured to couple to the deadbolt lock 20 and utilize components thereof as a sensing component, which may be referred to as an electrode, for the touch detector 220. As a result, the electronic door system 100 may be used with an existing deadbolt lock 20 and detect touches thereof. More particularly, a deadbolt lock 20 of a conventional type will typically include an external housing 26 (e.g., a shroud or escutcheon) that surrounds the keyed cylinder 24 and provides access thereto with mechanical keys. The external housing 26 provides the deadbolt lock 20 with the aesthetics of the deadbolt lock 20 on the exterior side 14 of the door 10, for example, having different shapes and/or colors. The external housing 26 is generally made of or otherwise includes a conductive material (e.g., a metal).

The touch sensor 622 of the touch detector 220 is electrically coupleable to the external housing 26 of the deadbolt lock 20, such that the external housing 26 functions as an electrode of the touch sensor 622 whereby capacitance may be measured for detecting touch thereto. As shown in FIGS. 6B-6C, the touch sensor 622 is conductively coupled to the deadbolt lock 20 and, in particular, to the external housing 26 with a fastener 626 (e.g., a screw or other threaded fastener). The fastener 626 may further function to mount the deadbolt lock 20 to the door 10 and/or mount the electronic door system 100 to the door 10.

The deadbolt lock 20 includes mounting holes 28 (e.g., in conductive bosses) in the external housing 26 (as shown) or other structure (e.g., the keyed cylinder 24 or a mounting plate) that receive threaded fasteners for coupling the external housing 26 in a conventional arrangement with an internal operator (e.g., the thumb turn) and, thereby, mounting the deadbolt lock 20 to the door 10. The deadbolt mechanism 22 may further include apertures through which one or more of the threaded fasteners 626 may extend and/or are contacted by the fastener 626.

The touch sensor 622 includes a conductive contact 622*a* that is electrically coupled thereto (e.g., via the circuit board 361) and that conductively engages the fastener 626. As shown, the conductive contact 622*a* is a boss (e.g., a standoff) formed of a conductive material (e.g., metal) and through which the fastener 626 extends, but may be configured in other manners (e.g., a conductive spring member that engages the fastener 626. The fastener 626 extends through the door 10 and is received by the holes 28 and, thereby, conductively couples the touch sensor 622 to the deadbolt lock 20 and the external housing 26 thereof. Thereby, the external housing 26 of the deadbolt lock 20 is conductively coupled to the touch sensor 622 and functions as an electrode thereof for measuring capacitance.

The fastener 626 may further function to mount the deadbolt lock 20 (e.g., the external housing 26 and the deadbolt mechanism 22 to the door 10.

In one example, the fastener 626 may be in conductive contact with both the deadbolt lock 20 (e.g., the external housing 26 and/or the deadbolt mechanism 22), for example, extending directly therebetween.

In other examples, intermediate electrically conductive members may be arranged between the fastener 626 and the deadbolt lock 20 (e.g., the external housing 26) and/or the touch sensor 622 (e.g., the conductive contact 622*a*), while the fastener 626 is still considered to electrically conductively couple the touch sensor 622 to the deadbolt lock 20 to function as an electrode thereof. Such intermediate conductive members may, for example, include a washer or metal plate (e.g., a mounting plate, such as the mounting plate 618). For example, as illustrated in FIG. 6D, the deadbolt lock 20 (e.g., the external housing 26, the mounting holes 28, and/or the deadbolt mechanism 22) may be conductively coupled to the mounting plate 618 with one of the fasteners 626 (e.g., to mount the deadbolt lock 20 to the door 10, as with fasteners extending through the mounting plate 618 and the bore of the door to the deadbolt 20), while the touch sensor 622 is electrically conductively coupled to the mounting plate with another of the fasteners 626 (e.g., extending through or otherwise conductively engaging the conductive contact 622*a*, which may also mechanically couple the electronic door lock 110 to the door 10 via the mounting plate). In this scenario, the touch sensor 622 is electrically coupled to the deadbolt 20 serially via a first fastener 626, the mounting plate 618, and a second fastener 626.

As shown in FIG. 6B, the touch detector 220 may, instead of or in addition to the touch sensor 622, include an interior touch sensor 627, which may detect touch to the cover 574 of the electronic door system 100. The interior touch sensor 627 may measure touch (e.g., force or pressure thereto) or may be a proximity sensor that measures capacitance (e.g., through the cover 574). The interior touch sensor 627 may be one of the sensors 366. Upon detecting a touch (or touch gesture, such as a double tap) with the interior touch sensor 627, the deadbolt operator 210 may be operated to lock or unlock the deadbolt lock 20 irrespective of an electronic key 245. Gestures may be advantageous, so as to avoid performing operations based on inadvertent touches (e.g., bumping into by a person, or a pet touching the interior touch sensor 627).

Figure 7A:
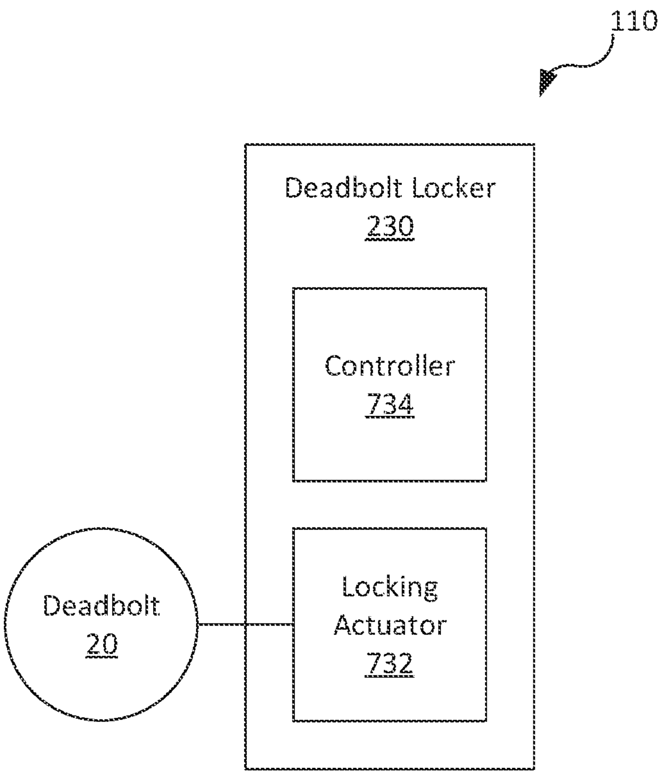
FIG. 7A is a schematic view of a deadbolt locker of the electronic door system of FIG. 2.
Figure 7B:
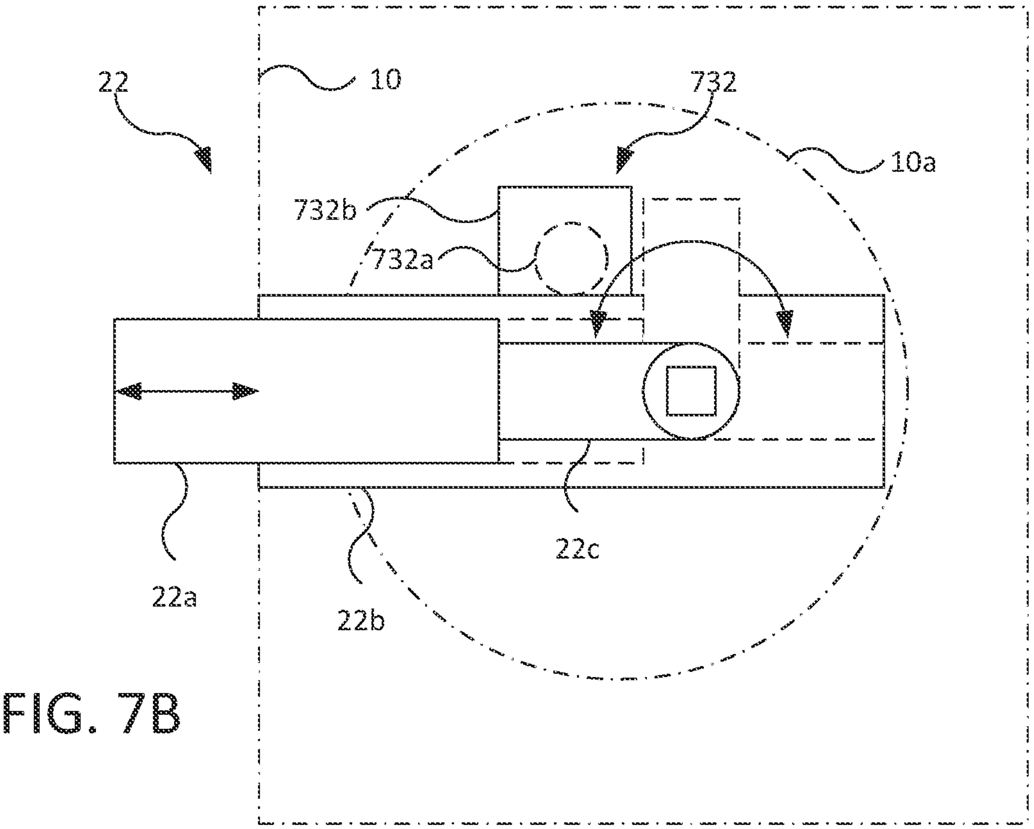
FIG. 7B is a partial cross-sectional view of the deadbolt locker and a deadbolt lock in a non-locking state.
Figure 7C:
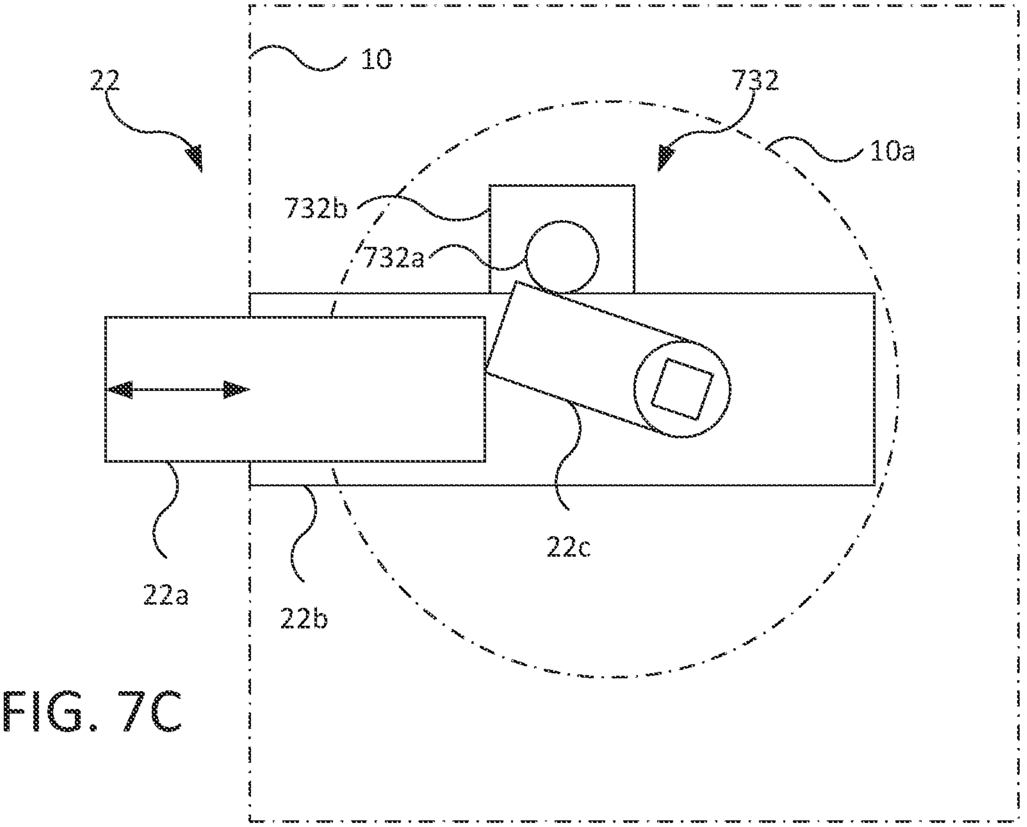
FIG. 7C is a partial cross-sectional view of the deadbolt locker and the deadbolt lock in a locking state.

Referring to FIGS. 7A-7C, the electronic door system 100 may include the deadbolt locker 230, which is a mechanical device that physically engages the deadbolt lock 20 (e.g., the deadbolt mechanism 22 independent of the spindle 516) to prevent operation thereof (e.g., the deadbolt locker 230 mechanically blocks the deadbolt lock 20). The deadbolt locker 230 generally includes a locking actuator 732 and a controller 734. The locking actuator 732 engages the deadbolt mechanism 22 to prevent operation thereof, as discussed in further detail below, and the controller 734 controls operation thereof. The controller 734 may be the controller 362, for example, such that the same controller controls operation of the deadbolt operator 210, the touch detector 220, and the deadbolt locker 230, or may be another suitable controller. The deadbolt locker 230 may also be referred to as a lock blocking, lock jamming device, or anti-picking actuator.

As shown in FIGS. 7B and 7C, the deadbolt mechanism 22 of the deadbolt lock 20 generally includes a bolt 22*a*, a body 22*b*, and a locking arm 22*c*, which are positioned within a bore 10*a* of the door 10 (both illustrated in broken dash-dot lines). As the pin (e.g., the spindle 516) is rotated, the bolt 22*a* is moved relative to the body 22*b* between an extended position (shown in solid lines) and a retracted position (shown in dashed lines). For example, a cam mechanism (not shown) may be arranged between the pin and the bolt 22*a*, whereby rotation of the pin causes movement of the bolt 22*a*. Furthermore, as the pin is rotated, the locking arm 22*c* rotates between a locking position (shown in solid lines) and a non-locking position (shown in dashed lines at two rotational positions). In the locking position, a distal end of the locking arm 22*c* engages an inner end of the bolt 22*a* to prevent retraction thereof into the body 22*b*. In the locking and non-locking positions of the locking arm 22*c*, the locking arm 22*c* is generally contained by the body 22*b* (e.g., being positioned below an upper edge thereof), while the distal end thereof extends above the body 22*b* when rotating therebetween.

The locking actuator 732 of the deadbolt locker 230 is configured to engage and, thereby, prevent movement of the locking arm 22*c* from the locking position to the non-locking position. Thereby, the distal end of the locking arm 22*c* remains engaged with the inner end of the bolt 22*a* to prevent retraction thereof. The locking actuator 732 includes, for example, a locking pin 732*a* and an actuator 732*b* (e.g., a motor or a solenoid). When the locking pin 732*a* is in a retracted position (e.g., indicated by dashed lines in FIG. 7B), the locking pin 732*a* is retracted toward the interior side 12 of the door 10 and, thereby, allows the locking arm 22*c* of the deadbolt mechanism 22 to rotate between the locking and non-locking positions. When the locking pin 732*a* is in an extended position (e.g., indicated by solid lines in FIG. 7C), the locking pin 732*a* is extended toward the exterior side 14 of the door 10 and is positioned above the locking arm to, thereby, engage and prevent rotation of the locking arm 22*c* from the locking position to the non-locking position thereof. The deadbolt locker 230 may further include a locking block (not shown or labeled) coupled to the locking pin 732*a* or otherwise movable by the locking actuator 732. The locking block, as compared to the locking pin 732*a*, may fill a larger space between the deadbolt mechanism 22 and the bore 10*a* of the door 10. Thus, as the locking arm 22*c* is attempted to be rotated, the locking arm 22*c* presses the locking block into the surface of the door 10 defining the bore 10*a*, thereby transferring force arising from the torque applied to the locking arm 22*c* from the locking block to the door. As a result, the locking actuator 732 may be required to bear only a nominal force in the radial direction of the locking pin 732*a*, while still preventing operation of the deadbolt lock 20.

Figure 8:
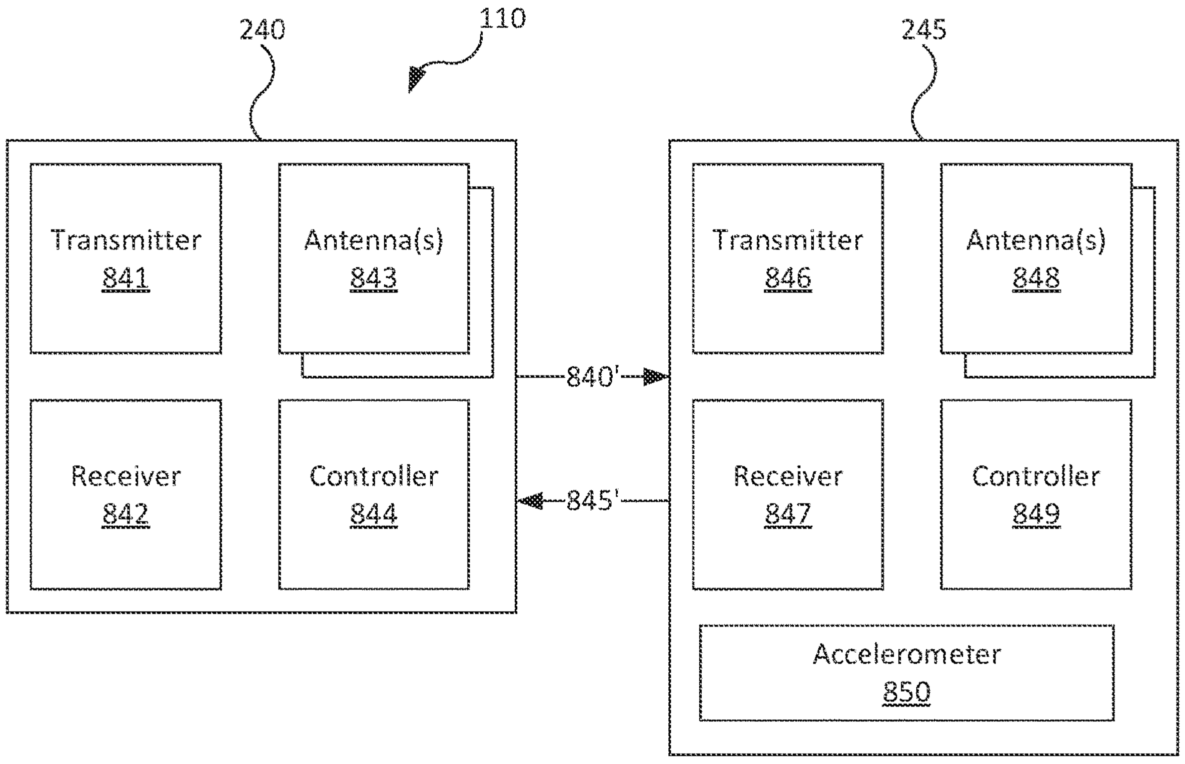
FIG. 8 is a schematic view of the electronic key detector in wireless communication with an electronic key.

Referring to FIG. 8, the electronic door system 100 may include the electronic key detector 240. The electronic key detector 240 determines whether any of the electronic keys 245 that are associated with the electronic door system 100 is in a detection region, such as the exterior space 8 or subregion thereof. A key detection is a determination that an electronic key is within the detection region.

Referring to FIG. 8B, the electronic key detector 240 generally includes a transmitter 841, a receiver 842, and one or more antennas 843 coupled thereto, as well as a controller 844 that controls sending of signals with the transmitter 841 and interprets signals received by the receiver 842. The controller 844 may be the controller 362, which may be shared or considered part of other subsystems of the electronic door system 100, or may be another similarly configured controller. The electronic keys 245, similarly, each include a transmitter 846, a receiver 847, and one or more antennas 848 coupled thereto, as well as a controller 849 that controls sending of signals with the transmitter 846 and interprets signals received by the receiver 847. The electronic key 245 may also include an accelerometer 850.

The electronic key detector 240 may detect the electronic key 245 in one or more various different manners. In one example, the electronic key detector 240 sends a lock signal 840' (e.g., a first, challenge, or door signal) to a broadcast region that forms the detection region. The lock signal 840' may be sent, for example, in response to detecting touch with the touch detector 220. If the electronic key 245 is within the broadcast region and receives the lock signal 840' at sufficient strength, the electronic key 245 receives the lock signal 840' and sends a key signal 845' (e.g., a second signal) in response thereto, which is then received by the electronic key detector 240. The lock signal 840' may be encrypted or otherwise secured, such that only those electronic keys 245 associated with the electronic key detector 240 may decipher the lock signal 840' and send the key signal 845' in response thereto. Those electronic keys 245 in the detection region but not associated with the electronic key detector 240 may not interpret (e.g., decrypt) the lock signal 840' and, therefore, will not send the key signal 845' in response thereto. Further, the electronic key detector 240 may filter out any of the key signals 845' that are received below a given signal strength (e.g., suggesting the electronic key 245 is outside the detection region). Still further, the key signal 845' may contain acceleration data from the accelerometer 850 of the electronic key 245 and may filter out any of the key signals 845' having acceleration data indicating no movement of the electronic key 245 (e.g., in case the electronic key 245 is inadvertently left on a stable surface in the detection region). The key signal 845' may also be encrypted, so as to only be decipherable by the electronic door system 100 associated with the electronic key 245. The lock signal 840' may further include identifying information, such as a username or unique alphanumeric code), which may enable the electronic key detector 240 to decipher between those electronic keys 245 associated therewith (e.g., electronic keys 245 of different users for which access through the door 10 should be permitted).

The electronic key 245 may be a dedicated purpose device (e.g., only functioning as an electronic key for use with the electronic key detector 240), or may be another multipurpose device with suitable hardware and software (e.g., a smartphone) for receiving and deciphering the lock signal 840' and sending the key signal 845' in response thereto.

Figure 9A:
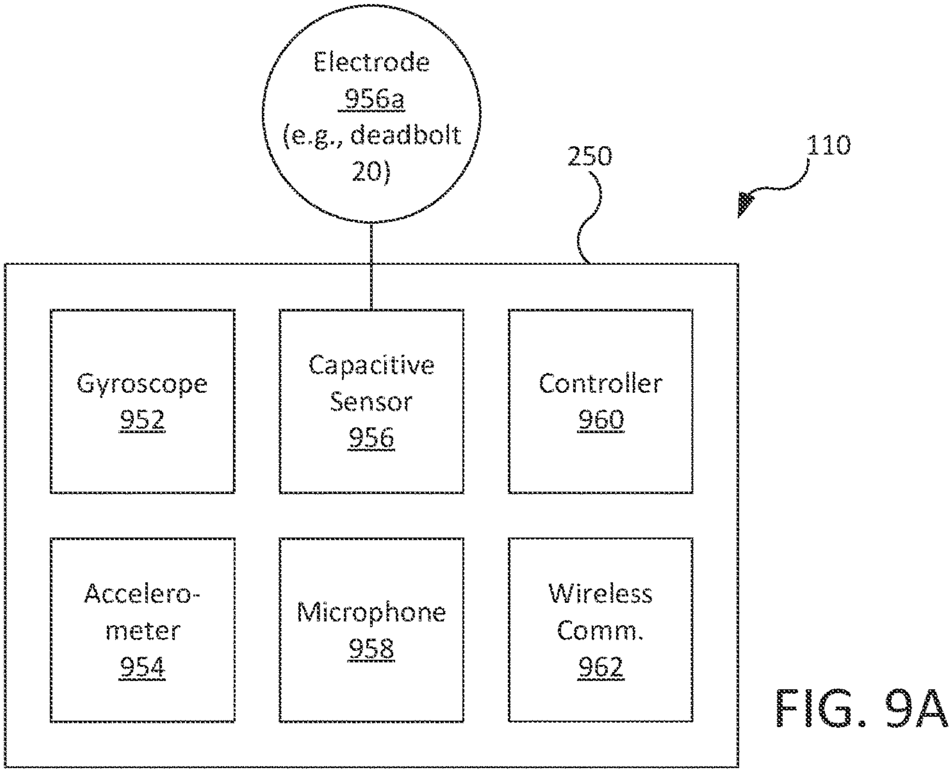
FIG. 9A is a schematic view of a door position assessor of the electronic door lock of FIG. 1.
Figure 9B:
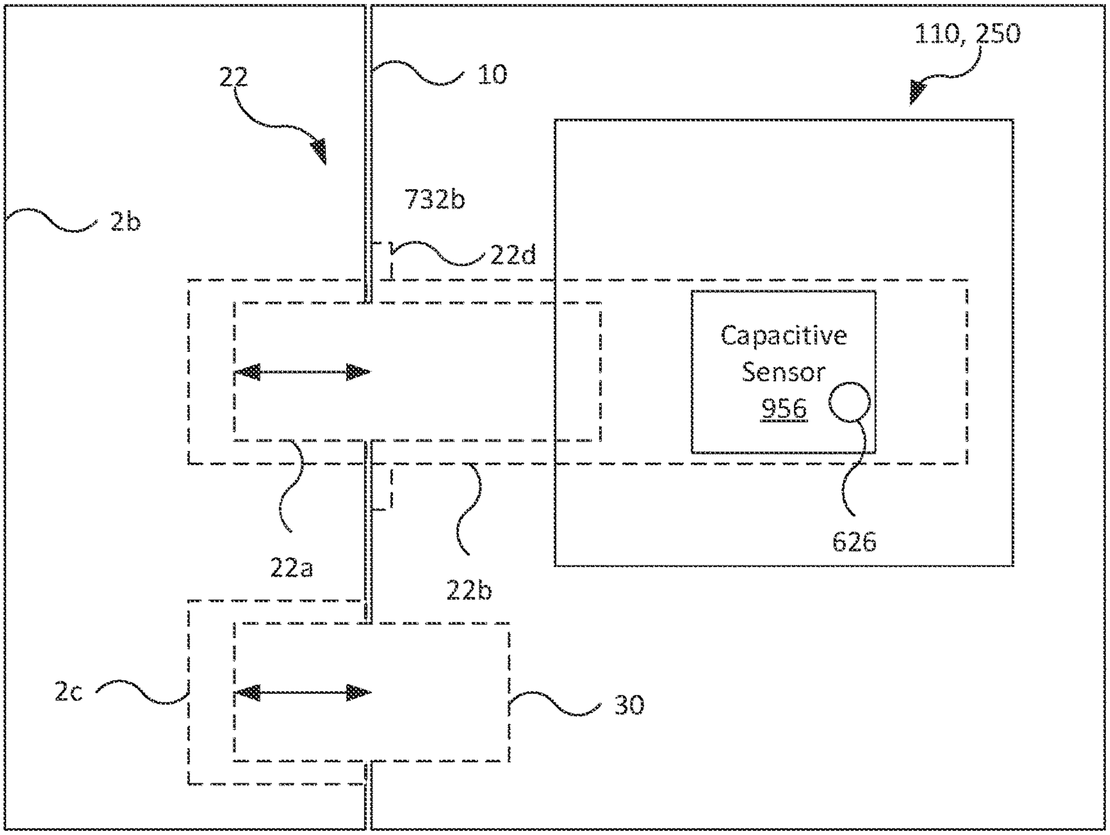
FIG. 9B is a partial view of the door position assessor with a door and building structure.

Referring to FIGS. 9A and 9B, the electronic door system 100 includes the door position assessor 250 that, as referenced previously, assesses the physical position of the door 10, for example, to determine whether the door 10 is closed and/or an angular position assessment. The door position assessor 250 includes one or more sensors for sensing one or more door position conditions that are indicative of the physical position of the door 10 and according to which the door position assessor 250 assesses the physical position of the door 10. As shown, the sensors of the door position assessor 250 may include one or more of a gyroscope 952, an accelerometer 954, a capacitive sensor 956, or a microphone 958. The door position conditions are physical conditions that are observable with the sensors. As discussed in further detail below, the door position conditions include angular velocity or position of the door 10 sensed by the gyroscope 952, linear acceleration of the door 10 sensed by the accelerometer 954, capacitance of the building structure 2 sensed by the capacitive sensor 956, or sound of the door 10 closing sensed by the microphone 958. The door position assessor 250 also includes a controller 960 and may include a wireless communication device 962.

The sensors of the door position assessor 250 (i.e., the one or more of the gyroscope 952, the accelerometer 954, the capacitive sensor 956, and the microphone 958) may be one of the sensors 366 of the electronic door system 100, which may also be used by (e.g., are components shared with) other subsystems of the electronic door system 100 (e.g., of the deadbolt operator 210, the touch detector 220, the deadbolt locker 230, or the electronic key detector 240). The controller 960 and the wireless communications device 962 may be the controller 362 and the wireless communication device 364, which may also be used by (e.g., are components shared with) other subsystems of the electronic door system 100 (e.g., of the deadbolt operator 210, the touch detector 220, the deadbolt locker 230, or the electronic key detector 240).

Multiple different door position conditions may be used to assess the physical position of the door 10. The use of additional door position conditions may advantageously provide greater accuracy and/or reliability to the assessment of the physical position of the door 10 by providing confirmation or otherwise increasing the overall confidence in the assessment of the physical position of the door 10. For example, while different ones of the sensors may be subject to errors (e.g., calibration, noise, resolution, drift) and the door position conditions may be subject to false positives (e.g., sensed door position conditions that would otherwise satisfy criteria for determining that the door 10 is in the closed physical position), the use of additional and different door position conditions may account for such sensor errors or inaccuracies and false positive scenarios to provide accurate assessments of the physical position.

The gyroscope 952 may be a single-axis gyroscope or, alternatively, a three-axis gyroscope that measures angular velocity about a first axis that is the hinge axis, a second axis that parallel to the plane 11 of the door 10 (e.g., an X-axis), and a third axis that is perpendicular to the plane 11 of the door 10 (e.g., a Y-axis). Alternatively, the one or more axes of the gyroscope 952 may be arranged in different axes from which the angular velocity and, thereby, the angular position of the door 10 about the hinge axis may be determined. The gyroscope 952 may, for example, be a micro-electronic mechanical system-type (MEMS) gyroscope. The gyroscope 952 may also be considered to include separate components (e.g., MEMS-gyroscopes) that measure angular velocity of the door 10 about the hinge axis and/or other axes. The door position assessor 250 calculates an angular position assessment of the door 10 from the physical angular velocity of the door 10.

The accelerometer 954 may, for example, be a three-axis accelerometer that measures linear acceleration in X-axis, Y-axis, and the Z-axis (i.e., the hinge axis). Alternatively, the accelerometer 954 may measure acceleration in different directions from which acceleration in the X-axis and the Y-axis may be calculated. The accelerometer 954 may, for example, be a micro-electronic mechanical system-type (MEMS) accelerometer. The accelerometer 954 may be provided as a singular component (e.g., a common chip) with the gyroscope 952. The accelerometer 954 may also be considered to include separate components (e.g., MEMS accelerometer devices) that measure linear acceleration of the door 10. The accelerometers 954 may be provided as a common component (e.g., chip) with the gyroscope 952. The physical linear acceleration in the X-axis (i.e., perpendicular to the plane 11 of the door 10) may indicate that the door 10 has been closed and, therefore, is in the closed physical position. As the door 10 is closed, the latch edge 18 of the door 10 may accelerate in the X-axis in a repeated pattern, which is referred to herein as the door closing acceleration profile and, when later detected, indicates that the door 10 may have been closed. In one example, which may be characteristic of many different combinations of doors 10 and building structures 2, the door closing acceleration profile includes at least two characteristic features of a first peak acceleration in an opening direction (i.e., opposite the direction to which the door 10 is moved into the closed physical position), and a second peak acceleration in a closing direction (i.e., the same direction as which the door 10 is moved to the closed physical) and having a lower magnitude than the first peak acceleration. The first peak acceleration represents the door 10 engaging in the closing direction a door stop of the building structure 2 on the latch-side jamb 2*b* and rebounding therefrom in the opening direction. The second peak acceleration represents a spring latch 30 (e.g., of a conventional door knob mechanism; not shown) engaging in the opening direction a corresponding latch receptacle 2*c* of the latch-side jamb 2*b* (e.g., of a corresponding strike plate) and rebounding therefrom in the closing direction. The door closing acceleration profile may also include a third peak acceleration that occurs temporally between the first peak acceleration and the second peak acceleration in the opening direction at a lower magnitude than the first peak acceleration.

The X-axis acceleration may be determined to indicate that the door 10 is in the closed physical position upon a favorable comparison of the X-axis acceleration measurements with the door closing acceleration profile as described above or otherwise determined for a particular combination of the door 10 and the building structure 2. Comparisons may, for example, be performed between directional patterns and/or magnitudes (e.g., ranges) of measured peak accelerations and those of the door closing acceleration profile and/or with any suitable pattern recognition technique, such as a machine learning technique. The door closing acceleration profile may be predetermined (e.g., as described above), determined during an initial setup operation (e.g., opening and closing the door repeatedly while X-axis acceleration measurements are taken), and/or adjusted over time (e.g., to account for physical changes of the door 10 and the building structure 2, such as from changes in humidity, temperature, and/or wear).

Linear acceleration in the Y-axis (i.e., horizontal and parallel to the plane 11 of the door 10) may indicate that the door 10 is moving. Because the door 10 rotates about the hinge-axis, acceleration parallel with the plane 11 of the door 10 is positive due to centripetal force whenever the door 10 is moved.

The capacitance measured from the door 10 refers to capacitance of the building structure 2 that is measured by the capacitive sensor 956 of the door position assessor 250. Stated differently, the capacitive sensor 956 capacitively senses the building structure 2. Detected capacitance may indicate that the door 10 is in the closed physical position. For example, capacitance of the building structure 2 sensed by the capacitive sensor 956 may be expected to be within a certain range and/or remain at a generally constant magnitude when the door 10 is in the closed physical position. This range of capacitance may be referred to as a closed-door capacitance value or range and form a capacitance criterion. The closed door capacitance value be different between different combinations of doors 10 and building structures 2 and, may, accordingly be determined during an initial setup process of the door position assessor 250 with a particular combination of the door 10 and the building structure 2 and/or updated over time (e.g., as temperature, humidity, and wear change spacing between the door 10 and the building structure 2 in the closed position).

Referring to FIGS. 9A and 9B, the capacitive sensor 956 may include, or be coupleable to, an electrode **956*a* (e.g., the deadbolt 20) that is positioned near the latch edge 18 of the door 10. For example, the electrode 956*a* may be positioned on the latch edge 18 of the door 10, such that when the door 10 is in the closed physical position, the capacitive sensor 956 senses the capacitance of the building structure 2. For example, as the door 10 is moved toward the closed position, the capacitance sensed by the capacitive sensor 956 may increase as the electrode 956*a* is moved into close proximity of the building structure 2. In one example, the deadbolt lock 20 (e.g., the deadbolt mechanism 22, such as a bolt 22*a* and/or a strike plate 22*d* thereof) is electrically coupled (e.g., conductively coupled) to the capacitive sensor 956 and functions as the electrode 956*a* thereof (e.g., with the fastener 626, as described above with respect to the touch sensor 622**).

It should be noted that in embodiments having the touch detector 220, the capacitive sensor 956 may be the same as the touch sensor 622 (e.g., the capacitive sensor 956 and the touch sensor 622 are the same sensor) or be a separate therefrom. In those embodiments in which both the door position assessor 250 and the touch detector 220 utilize the same capacitive sensor, the capacitance values of the building structure 2 (i.e., for the door position assessor 250) and of users (i.e., for the touch detector 220) are generally expected to be in non-overlapping ranges, have distinguishable patterns (e.g., generally constant values vs. momentary or fluctuating values, respectively), and/or occur in different angular positions of the door 10 (e.g., building capacitance sensed at less than 5, 3, 2, or 1 degrees), such that the electronic door system 100 is able to distinguish between capacitance of the building structure 2 and capacitance of a user. Further, for those embodiments in which both the door position assessor 250 and the touch detector 220 utilize the same capacitive sensor, the deadbolt lock 20 may function as the electrode for both the door position assessor 250 and the touch detector 220.

The sound sensed from the microphone 958 refers to sound from the door 10 moving into the closed position (e.g., engaging and coupling to the building structure 2). Detected sound may indicate that the door 10 has been closed, or has been opened, for example, if the sensed sound compares favorably to a previously-determined sound profile (e.g., using feature extraction and/or pattern recognition).

The sound, as sensed by the microphone 958, may be assessed in any suitable manner for assessing the physical position of the door 10 and, in particular, whether the door 10 has been closed and/or opened (e.g., using suitable audio recognition techniques). The audio signature of the door 10 closing and/or opening may be determined during an initial setup operation (e.g., opening and closing the door repeatedly while X-axis acceleration measurements are taken) and/or adjusted over time (e.g., to account for physical changes of the door 10 and the building structure 2, such as from changes in humidity, temperature, and/or wear).

As described above, the physical door position may be assessed according to one or more of the sensors (e.g., the gyroscope 952, the accelerometer 954, the capacitive sensor 956, or the microphone 958) and/or according to one or more of the door position conditions (i.e., the angular velocity or angular position of the door 10, acceleration of the door 10 perpendicular to the plane 11 thereof, capacitance of the building structure 2, or sound of the door 10 closing). Door position conditions may also include operation of the deadbolt 20 with the deadbolt operator 210, such as whether the deadbolt 20 is in the extended position or retracted position, or whether the deadbolt operator 210 is able to move the deadbolt 20 into the extended position, which may be used in conjunction with one or more of the other door position conditions to assess the physical position of the door 10. By using more than one of the sensors and/or more than one of the door position conditions, the door position assessment may more accurately and/or reliably reflect the physical position of the door 10, including whether the door 10 is closed (i.e., is in the closed physical position). When assessing the physical door position with multiple of the door position conditions, the multiple door position conditions may be assessed in different manners. Further, the various sensing operations described herein may be considered to include appropriate signal processing of sensor data (e.g., to remove noise from the sensor output), outputting sensor data that includes information about the door conditions from the sensor (e.g., by sending a sensor data signal), and storing the sensor data (e.g., for processing or storage), which may be performed by a processor, such as the controller 960.

Various techniques and methodologies may be used to assess whether the door 10 is closed (e.g., is in the closed physical position). As referenced above, the physical position of the door 10, including whether the door 10 is in the closed physical position, may be assessed using one or more multiple different door sensors and/or one or more multiple door position conditions sensed thereby.

A method for assessing whether the door 10 is closed (e.g., is in the closed physical position) may generally include sensing one or more door conditions (e.g., angular velocity or angular position, linear acceleration, capacitance, and/or sound), individual processing of the one more door conditions to determine whether the door 10 is closed, cooperatively processing two or more of the door conditions to determine the door status, and performing a further action according to the door status. The individual processing of the door conditions may be performed in independent and/or combined manners, which may include use of a sensor fusion algorithm (e.g., Kalman filter).

As shown in FIG. 2, the electronic door system 100 includes the authentication device 170. The authentication device 170 is configured to receive one or more authentication inputs, which may include images captured thereby and/or physical input codes. In the case of images captured by the authentication device 170, the authentication device 170 may process the images to authenticate users, capture and transmit the images to the electronic door lock 110 that then processes the images to authenticate users, or may transmit the images to a remote computing device that then processes the images to authenticate users. In the case of input codes, the authentication device 170 detects physical inputs (e.g., button presses) used to authenticate users.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An electronic door lock in combination with a deadbolt lock located on a hinged door of a building structure and having a bolt that is extended and retracted by rotation of a spindle, the electronic door lock comprising:

a stator assembly having windings that are operated to produce magnetic fields;

a rotor assembly having a shaft and permanent magnets rotationally fixed to the shaft and that cooperatively rotate relative to the stator assembly, the magnetic fields of the windings interacting with the permanent magnets to cause rotation of the rotor assembly relative to the stator; and a cover:

wherein the permanent magnets are positioned radially outward of the windings; and wherein the shaft extends axially through the stator assembly radially inward of the windings and is rotationally supported by the stator assembly, and a distal end of the shaft is configured to rotationally couple to the spindle of the deadbolt lock to rotate the spindle in a 1:1 drive ratio with the rotor assembly to, thereby, extend and retract the bolt;

wherein the electronic door lock does not include a gear reduction for rotating the spindle;

wherein the electronic door lock is coupleable to the hinged door such that the electronic door lock moves with the hinged door as the hinged door is rotated about a hinge axis;

wherein the rotor assembly further includes a rotor sleeve to which the permanent magnets are coupled, a rotor shaft assembly, and a thumb turn;

wherein the rotor shaft assembly includes a rotor flange that is coupled to, extends radially between, and transfers torque between the rotor sleeve and the shaft;

wherein the rotor flange includes a proximal face and a distal face opposite the proximal face, the thumb turn being coupled to a protrusion extending axially from the proximal face and being configured to be physically engaged by a user to rotate the rotor assembly, and the shaft extending axially from the distal face; and wherein the cover is arranged between a motor, formed by the stator assembly and the rotor assembly, and the thumb turn, and the protrusion is axially aligned with the shaft and extends from the proximal face in a direction opposite the shaft through an aperture of the cover to be coupled to the thumb turn.

2. The electronic door lock according to claim 1, further comprising an adapter and a chassis;

wherein the adapter is rotationally coupled to the distal end of the shaft and rotationally coupleable to the spindle of the deadbolt lock, the adapter being configured to extend axially between and transfer torque between the distal end of the shaft and the spindle, and rotate the spindle at the 1:1 drive ratio with the shaft and the adapter;

wherein the stator assembly further includes a core and stator carrier, the core including a central aperture and radially extending teeth about which each of the windings is formed;

wherein the stator carrier includes a carrier flange, a tubular portion coupled to the carrier flange, and one or more bearings, the tubular portion extending axially through the central aperture of and being rotationally fixed to the core, the carrier flange extending radially outward from the tubular portion and being coupled to the chassis, and the one or more bearings being located within the tubular portion and rotationally supporting the shaft relative to the stator assembly.

3. The electronic door lock according to claim 1, further comprising an adapter that is rotationally coupled to the distal end of the shaft and rotationally coupleable to the spindle of the deadbolt lock, the adapter being configured to extend axially between and transfer torque between the distal end of the shaft and the spindle.

4. The electronic door lock according to claim 3, wherein the shaft is configured to rotate the spindle at a 1:1 drive ratio therewith.

5. The electronic door lock according to claim 1, further comprising a chassis;

wherein the stator assembly further includes a core and stator carrier;

wherein the core includes a central aperture and radially extending teeth about which each the windings is formed; and wherein the stator carrier includes an axially-extending portion and a radially-extending portion coupled thereto, the axially-extending portion extending axially through the central aperture and being rotationally fixed to the core, and the radially-extending portion extending radially outward from the axially-extending portion and being coupled to the chassis.

6. The electronic door lock according to claim 5, wherein the stator assembly further includes a first bearing and a second bearing that rotationally support the shaft of the rotor assembly, the first bearing being located within another proximal end of the axially-extending portion, and the second bearing being located within another distal end of the axially-extending portion near the radially-extending portion.

7. The electronic door lock according to claim 1, wherein the rotor shaft assembly includes the shaft.

* * * * *